US012408201B2

(12) United States Patent
Salem

(10) Patent No.: US 12,408,201 B2
(45) Date of Patent: Sep. 2, 2025

(54) METHODS AND APPARATUSES FOR COT SHARING IN UNLICENSED SPECTRUM

(71) Applicant: Huawei Technologies Co., Ltd., Shenzhen (CN)

(72) Inventor: Mohamed Adel Salem, Kanata (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 18/606,858

(22) Filed: Mar. 15, 2024

(65) Prior Publication Data
US 2024/0244660 A1 Jul. 18, 2024

Related U.S. Application Data

(63) Continuation of application No. 17/944,632, filed on Sep. 14, 2022, now Pat. No. 11,979,907, which is a
(Continued)

(51) Int. Cl.
*H04W 72/00* (2023.01)
*H04W 16/14* (2009.01)
(Continued)

(52) U.S. Cl.
CPC ....... *H04W 74/0808* (2013.01); *H04W 16/14* (2013.01); *H04W 72/21* (2023.01); *H04W 72/23* (2023.01); *H04W 74/0875* (2013.01)

(58) Field of Classification Search
None
See application file for complete search history.

(56) References Cited

U.S. PATENT DOCUMENTS

2017/0325216 A1 11/2017 Nogami et al.
2018/0124749 A1 5/2018 Park et al.
(Continued)

FOREIGN PATENT DOCUMENTS

CN 105592478 A 5/2016
CN 105992345 A 10/2016
(Continued)

OTHER PUBLICATIONS

Qualcomm Incorporated, "Channel access procedures for NR unlicensed," 3GPP TSG RAN WG1 Meeting #98, R1-1909245, Prague, CZ, Aug. 26-Aug. 30, 2019, total 18 pages.
(Continued)

*Primary Examiner* — Abdelillah Elmejjarmi
(74) *Attorney, Agent, or Firm* — Slater Matsil, LLP

(57) ABSTRACT

A user equipment (UE) may transmit a configured-grant uplink control information (CG-UCI) to a base station during a channel occupancy time (COT) initiated by the UE in a shared spectrum, the CG-UCI comprising COT sharing information, the COT sharing information indicating, at least, an index value corresponding to a combination of: an indication of an offset to a beginning of a downlink transmission opportunity during the COT; an indication of a duration of the downlink transmission opportunity during the COT; and an indication of a channel access priority class (CAPC) value used by the UE to initiate the COT. The base station may transmit a downlink transmission to the UE within the downlink transmission opportunity and in accordance with the COT sharing information in the transmitted CG-UCI. Apparatuses are also disclosed.

20 Claims, 10 Drawing Sheets

Related U.S. Application Data continuation of application No. 17/036,517, filed on Sep. 29, 2020, now Pat. No. 11,792,848.

(60) Provisional application No. 62/911,161, filed on Oct. 4, 2019.

(51) Int. Cl.
  H04W 72/21 (2023.01)
  H04W 72/23 (2023.01)
  H04W 74/08 (2009.01)
  H04W 74/0808 (2024.01)

(56) References Cited

U.S. PATENT DOCUMENTS

| | | | |
|---|---|---|---|
| 2018/0359772 A1 | 12/2018 | Park et al. | |
| 2019/0075581 A1 | 3/2019 | Salem et al. | |
| 2019/0274054 A1 | 9/2019 | Salem | |
| 2020/0314899 A1 | 10/2020 | Sun et al. | |
| 2021/0068149 A1 | 3/2021 | Bhattad et al. | |
| 2021/0092783 A1 | 3/2021 | Sun et al. | |
| 2022/0167407 A1 | 5/2022 | Oviedo et al. | |
| 2022/0330338 A1 | 10/2022 | Karaki et al. | |
| 2023/0132437 A1* | 5/2023 | Lei | H04L 5/0091 370/329 |
| 2023/0232447 A1* | 7/2023 | Lin | H04W 74/0808 370/329 |

FOREIGN PATENT DOCUMENTS

| | | |
|---|---|---|
| CN | 107769830 A | 3/2018 |
| EP | 3399822 A1 | 11/2018 |
| WO | 2020190190 A1 | 9/2020 |
| WO | 2020223372 A1 | 11/2020 |
| WO | 2021026692 A1 | 2/2021 |
| WO | 2021061880 A1 | 4/2021 |

OTHER PUBLICATIONS

"3rd Generation Partnership Project; Technical Specification Group Radio Access Network; NR; Multiplexing and channel coding (Release 15)," 3GPP TS 38.212 V15.7.0, Technical Specification, Sep. 2019, 101 Pages.

"3rd Generation Partnership Project; Technical Specification Group Radio Access Network; NR; Radio Resource Control (RRC) protocol specification (Release 15)," 3GPP TS 38.331 V15.7.0, Technical Specification, Sep. 2019, 527 Pages.

"3rd Generation Partnership Project; Technical Specification Group Radio Access Network; Physical layer procedures fro shared spectrum channel access (Release 15)," 3GPP TSG 37.213 V15.2.0, Technical Specification, Mar. 2019, 20 Pages.

"3rd Generation Partnershup Project; Technical Specification Group Radio Access Network; Evolved Universal Terrestrial Radio Access (E-UTRA); Multiplexing and channel coding (Release 15)," 3GPP TS 36.212, V15.7.0, Technical Specification, Sep. 2019, 240 Pages.

Ericsson, "Configured grant enhancement," 3GPP TSG-RAN WG1 Meeting #98, R1-1909301, Aug. 26-30, 2019, 6 Pages, Prague, Czech Republic.

Huawei et al., "Maintenance on the configured grant procedures," 3GPP TSG RAN WG1 Meeting #100bis-e, R1-2001537, Apr. 20-Apr. 30, 2020, 10 Pages, E-meeting.

Huawei, et al., "Transmission with configured grant in NR unlicensed band," 3GPP TSG RAN WG1 Meeting #98, R1-1908112, Aug. 26-30, 2019, 18 Pages, Prague, Czech Republic.

Huawei, et al., "Transmission with configured grant in NR unlicensed band," 3GPP TSG RAN WG1 Meeting #96, R1-1901528, Feb. 25-Mar. 1, 2019, 15 Pages, Athens, Greece.

Huawei, et al., "Coexistence and channel access for NR unlicensed band operations," 3GPP TSG RAN WG1 Meeting #98bis, R1-1910045, Oct. 14-20, 2019, 18 Pages, Chongqing, China.

Huawei, et al., "Transmission with configured grant in NR unlicensed band," 3GPP TSG RAN WG1 Meeting #98bis, R1-1910048, Oct. 14-20, 2019, 22 Pages, Chongqing, China.

Intel Corporation, "Enhancements to configured grants for NR-unlicensed," 3GPP TSG RAN WG1 Meeting #98, R1-1908627, Aug. 26-30, 2019, 11 Pages, Prague, Czechia.

Intel Corporation, "Enhancements to configured grants for NR-unlicensed,",3GPP TSG RAN WG1 Meeting #96, R1-1902474, Feb. 25-Mar. 1, 2019, 7 Pages, Greece.

LG Electronics, "Discussion on configured grant for NR-U," 3GPP TSG RAN WG1 Meeting #98, R1-1908538, Aug. 26-30, 2019, 7 Pages, Prague, Czech Republic.

Nokia, et al., "Feature Lead's Summary #3 on Channel Access Procedures," 3GPP TSG RAN WG1 Meeting #98, R1-1909810, Aug. 26-30, 2019, 27 Pages, Prague, Czech Republic.

Nokia, et al., "Channel access and co-existence for NR-U operation," 3GPP TSG RAN WG1 Meeting #98, R1-1908682, Aug. 26-30, 2019, 11 Pages, Prague, Czech Republic.

NTT Docomo, Inc, "Configured grant enhancement for NR-U," 3GPP TSG RAN WG1 #98, R1-1909180, Aug. 26-30, 2019, 5 Pages, Prague, CZ.

Qualcomm Incorporated, "Enhancement to configured grants in NR unlicensed," GPP TSG RAN WG1 Meeting #98, R1-1909248, Aug. 26-Aug. 30, 2019, 12 Pages, Prague, CZ.

Samsung, "Enhancements on configured grant for NR-U," 3GPP TSG RAN WG1 #98, R1-1908468, Aug. 26-30, 2019, 5 Pages, Prague, CA.

Sony, "Channel access for NR unlicensed operations," 3GPP TSG RAN WG1 #98, R1-1908765, Aug. 26-30, 2019, 4 Pages, Prague, CZ.

Vivo, "Discussion on the enhancements to configured grants," 3GPP TSG RAN WG1 #97, R1-1906133, May 13-17, 2019, 10 Pages, Reno, USA.

Vivo, "Feature lead summary on Configured grant enhancement," 3GPP TSG RAG WG1#98, R1-1909476, Aug. 26-30, 2019, 14 Pages, Prague, CZ.

* cited by examiner

METHODS AND APPARATUSES FOR COT SHARING IN UNLICENSED SPECTRUM

CROSS-REFERENCE TO RELATED APPLICATIONS

This application is a continuation of U.S. patent application Ser. No. 17/944,632, filed on Sep. 14, 2022, and entitled "Methods and Apparatuses for COT Sharing in Unlicensed Spectrum," now U.S. Pat. No. 11,979,907, issued on May 7, 2024, which is a continuation of U.S. patent application Ser. No. 17/036,517, filed on Sep. 29, 2020, and entitled "Methods and Apparatuses for COT Sharing in Unlicensed Spectrum," now U.S. Pat. No. 11,792,848 issued on Oct. 17, 2023, which claims the benefit of U.S. Provisional Patent Application No. 62/911,161, filed on Oct. 4, 2019, and entitled "Methods and Apparatuses for COT Sharing in Unlicensed Spectrum," the entire contents of applications of which are incorporated by reference herein.

TECHNICAL FIELD

This disclosure relates generally to methods and apparatuses for configured-grant transmission, and more specifically to methods and apparatuses for channel occupancy time (COT) sharing in unlicensed spectrum.

BACKGROUND

In some wireless communication systems, a user equipment (UE) wirelessly communicates with a base station to send data to the base station and/or receive data from the base station. A wireless communication from a UE to a base station is referred to as an uplink (UL) communication. A wireless communication from a base station to a UE is referred to as a downlink (DL) communication.

Resources are required to perform uplink and downlink communications. For example, a UE may wirelessly transmit data to a base station in an uplink transmission at a particular frequency and/or during a particular slot in time. The frequency and time slot used are examples of resources.

In some wireless communication systems, if a UE wants to transmit data to a base station, the UE requests uplink resources from the base station. The base station grants the uplink resources, and then the UE sends the uplink transmission using the granted uplink resources. A transmission in such uplink resources granted by a base station is referred to as a grant-based or scheduled UL transmission.

However, a UE may send uplink transmissions using certain semi-statically configured uplink resources without specifically requesting use of the resources and without being dynamically granted use of the resources by the base station. Such transmissions are referred to as grant-free, grant-less, schedule-free, schedule-less, or configured-grant uplink transmissions. A UE sending a configured-grant uplink transmission, or configured to send a configured-grant uplink transmission, may be referred to as operating in grant-free mode or in configured-grant mode.

One advantage of configured-grant transmission is lower latency resulting from not having to request and receive a grant for an allocated time slot from a base station. Further, in a configured-grant transmission, scheduling overhead may be reduced. In a configured-grant scheme, the same uplink resources can be accessible to multiple configured-grant UEs served by the same base station.

There is a desire for configured-grant and sidelink transmission schemes that can make more efficient use of available resources.

SUMMARY

According to one embodiment, there is disclosed a method performed by a user equipment (UE) for configured-grant transmission, the method comprising: transmitting, by the UE, a configured-grant uplink control information (CG-UCI) to a base station during a channel occupancy time (COT) in an unlicensed spectrum, the CG-UCI comprising an indication of a time delay to a beginning of a downlink transmission opportunity during the COT; and receiving, by the UE, a downlink transmission within the downlink transmission opportunity.

In some embodiments, the CG-UCI further comprises an indication of a duration of the downlink transmission opportunity.

In some embodiments, the indication of the duration indicates, at least, a number of time slots of the downlink transmission opportunity.

In some embodiments, the CG-UCI comprises a value of an index, the value of the index comprising the indication of the time delay and the indication of the duration.

In some embodiments, the value of the index indicates, at least, a combination in an ordered set of combinations of: time delays to the beginning of the downlink transmission opportunity; and durations of the downlink transmission opportunity.

In some embodiments, the indication of the time delay indicates, at least, a number of time slots of the COT from transmission of the CG-UCI to the beginning of the downlink transmission opportunity.

In some embodiments, the indication of the time delay indicates, at least, that the beginning of the downlink transmission opportunity is in a same time slot of the COT as an end of an uplink burst comprising the transmission of the CG-UCI.

In some embodiments, the indication of the time delay indicates, at least, that the beginning of the downlink transmission opportunity is in a same time slot of the COT as the transmission of the CG-UCI.

In some embodiments, the indication of the time delay comprises a value of at least one bit in the CG-UCI indicating an end of the uplink burst comprising the transmission of the CG-UCI.

In some embodiments, the indication of the time delay comprises a value of an index, the value of the index comprising the indication of the time delay, and some other values of the index identify respective combinations in an ordered set of combinations of: time delays to the beginning of the downlink transmission opportunity; and durations of the downlink transmission opportunity.

In some embodiments, the indication of the time delay indicates, at least, a symbol of the beginning of the downlink transmission opportunity.

In some embodiments, receiving the downlink transmission comprises receiving the downlink transmission from the base station.

In some embodiments, receiving the downlink transmission comprises receiving the downlink transmission in at least one physical downlink shared channel (PDSCH).

In some embodiments, transmitting the CG-UCI to the base station comprises transmitting a physical uplink shared channel (PUSCH) comprising the CG-UCI.

In some embodiments, the COT was initiated by the UE.

In some embodiments, the COT was initiated by the UE in a channel access priority class (CAPC), and the CG-UCI further comprises an indication of the CAPC.

According to another embodiment, there is disclosed a user equipment (UE) apparatus comprising: at least one processor; and at least one processor-readable storage device comprising stored thereon processor-executable instructions that, when executed by the at least one processor, cause the at least one processor to, at least, execute the method.

According to another embodiment, there is disclosed a method performed by a base station for configured-grant transmission, the method comprising: receiving, by the base station, a configured-grant uplink control information (CG-UCI) from a user equipment (UE) during a channel occupancy time (COT) in an unlicensed spectrum, the CG-UCI comprising an indication of a time delay to a beginning of a downlink transmission opportunity during the COT; and transmitting, by the base station, a downlink transmission to the UE within the downlink transmission opportunity.

In some embodiments, the CG-UCI further comprises an indication of a duration of the downlink transmission opportunity.

In some embodiments, the indication of the duration indicates, at least, a number of time slots of the downlink transmission opportunity.

In some embodiments, the CG-UCI comprises a value of an index, the value of the index comprising the indication of the time delay and the indication of the duration.

In some embodiments, the value of the index indicates, at least, a combination in an ordered set of combinations of: time delays to the beginning of the downlink transmission opportunity; and durations of the downlink transmission opportunity.

In some embodiments, the indication of the time delay indicates, at least, a number of time slots of the COT from transmission of the CG-UCI to the beginning of the downlink transmission opportunity.

In some embodiments, the indication of the time delay indicates, at least, that the beginning of the downlink transmission opportunity is in a same time slot of the COT as an end of an uplink burst comprising the transmission of the CG-UCI.

In some embodiments, the indication of the time delay indicates, at least, that the beginning of the downlink transmission opportunity is in a same time slot of the COT as the transmission of the CG-UCI.

In some embodiments, the indication of the time delay comprises a value of at least one bit in the CG-UCI indicating an end of the uplink burst comprising the transmission of the CG-UCI.

In some embodiments, the indication of the time delay comprises a value of an index, the value of the index comprising the indication of the time delay, and some other values of the index identify respective combinations in an ordered set of combinations of: time delays to the beginning of the downlink transmission opportunity; and durations of the downlink transmission opportunity.

In some embodiments, the indication of the time delay indicates, at least, a symbol of the beginning of the downlink transmission opportunity.

In some embodiments, transmitting the downlink transmission comprises transmitting the downlink transmission in at least one physical downlink shared channel (PDSCH).

In some embodiments, receiving the CG-UCI comprises receiving a physical uplink shared channel (PUSCH) comprising the CG-UCI.

In some embodiments, the COT was initiated by the UE.

In some embodiments, the COT was initiated by the UE in a channel access priority class (CAPC), and the CG-UCI further comprises an indication of the CAPC.

According to another embodiment, there is disclosed a base station apparatus comprising: at least one processor; and at least one processor-readable storage device comprising stored thereon processor-executable instructions that, when executed by the at least one processor, cause the at least one processor to, at least, execute the method.

According to another embodiment, there is disclosed a method performed by a user equipment (UE) for configured-grant transmission, the method comprising transmitting, by the UE, a configured-grant uplink control information (CG-UCI) to a base station during a channel occupancy time (COT) initiated by the UE in a shared spectrum, the CG-UCI comprising COT sharing information, the COT sharing information indicating, at least, an index value corresponding to a combination of: an indication of an offset to a beginning of a downlink transmission opportunity during the COT; an indication of a duration of the downlink transmission opportunity during the COT; and an indication of a channel access priority class (CAPC) value used by the UE to initiate the COT. The method further comprises receiving, by the UE, a downlink transmission from the base station within the downlink transmission opportunity and in accordance with the COT sharing information in the transmitted CG-UCI.

In some embodiments, the indication of the duration indicates, at least, a number of time slots of the downlink transmission opportunity.

In some embodiments, the indication of the offset indicates, at least, a number of time slots of the COT from transmission of the CG-UCI to the beginning of the downlink transmission opportunity.

In some embodiments, receiving the downlink transmission comprises receiving the downlink transmission in at least one physical downlink shared channel (PDSCH).

In some embodiments, transmitting the CG-UCI to the base station comprises transmitting a physical uplink shared channel (PUSCH) comprising the CG-UCI.

In some embodiments, the index value corresponds to a row of a configured table of COT sharing combinations, the row corresponding to the combination, and at least one row of the configured table of COT sharing combinations indicates that COT sharing is not available.

In some embodiments, the index value corresponds to a row of a configured table of COT sharing combinations, the row corresponding to the combination, and a bitwidth of the COT sharing information in the CG-UCI is $\lceil \log_2 C \rceil$ bits, where C is a number of combinations configured in the table.

In some embodiments, the method further comprises, after transmitting the CG-UCI to the base station and before the beginning of the downlink transmission opportunity, transmitting, by the UE, at least one subsequent CG-UCI to the base station during the COT. In some embodiments, each subsequent CG-UCI of the at least one subsequent CG-UCI comprises COT sharing information indicating, at least, the downlink transmission opportunity.

In some embodiments, transmitting the CG-UCI to the base station comprises transmitting the CG-UCI to the base station in an uplink burst, and a switching gap between the uplink burst and the downlink transmission is: 16 μs or 25 μs if a downlink listen-before talk (LBT) procedure after the uplink burst and before the downlink transmission is a category 2 (CAT2) downlink LBT procedure; and at most 16

μs if the downlink LBT procedure is a category 1 (CAT1) downlink LBT procedure without LBT being performed in the switching gap.

According to another embodiment, there is disclosed a user equipment (UE) apparatus comprising at least one processor. The UE further comprises at least one processor-readable storage device comprising stored thereon processor-executable instructions that, when executed by the at least one processor, cause the at least one processor to, at least, transmit a configured-grant uplink control information (CG-UCI) to a base station during a channel occupancy time (COT) initiated by the UE in a shared spectrum, the CG-UCI comprising COT sharing information, the COT sharing information indicating, at least, an index value corresponding to a combination of: an indication of an offset to a beginning of a downlink transmission opportunity during the COT; an indication of a duration of the downlink transmission opportunity during the COT; and an indication of a channel access priority class (CAPC) value used by the UE to initiate the COT. The processor-executable instructions, when executed by the at least one processor, further cause the at least one processor to, at least, receive a downlink transmission from the base station within the downlink transmission opportunity and in accordance with the COT sharing information in the transmitted CG-UCI.

In some embodiments, the indication of the duration indicates, at least, a number of time slots of the downlink transmission opportunity.

In some embodiments, the indication of the offset indicates, at least, a number of time slots of the COT from transmission of the CG-UCI to the beginning of the downlink transmission opportunity.

In some embodiments, the processor-executable instructions that, when executed by the at least one processor, cause the at least one processor to receive the downlink transmission comprise processor-executable instructions that, when executed by the at least one processor, cause the at least one processor to receive the downlink transmission in at least one physical downlink shared channel (PDSCH).

In some embodiments, the processor-executable instructions that, when executed by the at least one processor, cause the at least one processor to transmit the CG-UCI to the base station comprise processor-executable instructions that, when executed by the at least one processor, cause the at least one processor to transmit a physical uplink shared channel (PUSCH) comprising the CG-UCI.

In some embodiments, the index value corresponds to a row of a configured table of COT sharing combinations, the row corresponding to the combination, and at least one row of the configured table of COT sharing combinations indicates that COT sharing is not available.

In some embodiments, the index value corresponds to a row of a configured table of COT sharing combinations, the row corresponding to the combination, and a bitwidth of the COT sharing information in the CG-UCI is $\lceil \log_2 C \rceil$ bits, where C is a number of combinations configured in the table.

In some embodiments, the processor-executable instructions, when executed by the at least one processor, further cause the at least one processor to, at least, after transmitting the CG-UCI to the base station and before the beginning of the downlink transmission opportunity, transmit at least one subsequent CG-UCI to the base station during the COT. In some embodiments, each subsequent CG-UCI of the at least one subsequent CG-UCI comprises COT sharing information indicating, at least, the downlink transmission opportunity.

In some embodiments, the processor-executable instructions that, when executed by the at least one processor, cause the at least one processor to transmit the CG-UCI to the base station comprise processor-executable instructions that, when executed by the at least one processor, cause the at least one processor to transmit the CG-UCI to the base station in an uplink burst such that a switching gap between the uplink burst and the downlink transmission is: 16 μs or 25 μs if a downlink listen-before talk (LBT) procedure after the uplink burst and before the downlink transmission is a category 2 (CAT2) downlink LBT procedure; and at most 16 μs if the downlink LBT procedure is a category 1 (CAT1) downlink LBT procedure without LBT being performed in the switching gap.

According to another embodiment, there is disclosed a method performed by a base station for configured-grant transmission, the method comprising receiving, by the base station, a configured-grant uplink control information (CG-UCI) from a user equipment (UE) during a channel occupancy time (COT) initiated by the UE in a shared spectrum, the CG-UCI comprising COT sharing information, the COT sharing information indicating, at least, an index value corresponding to a combination of: an indication of an offset to a beginning of a downlink transmission opportunity during the COT; an indication of a duration of the downlink transmission opportunity during the COT; and an indication of a channel access priority class (CAPC) value used by the UE to initiate the COT. The method further comprises transmitting, by the base station, a downlink transmission to the UE within the downlink transmission opportunity and in accordance with the COT sharing information in the transmitted CG-UCI.

In some embodiments, the indication of the duration indicates, at least, a number of time slots of the downlink transmission opportunity.

In some embodiments, the indication of the offset indicates, at least, a number of time slots of the COT from detection of the CG-UCI to the beginning of the downlink transmission opportunity.

In some embodiments, transmitting the downlink transmission comprises transmitting the downlink transmission in at least one physical downlink shared channel (PDSCH).

In some embodiments, receiving the CG-UCI comprises receiving a physical uplink shared channel (PUSCH) comprising the CG-UCI.

In some embodiments, the index value corresponds to a row of a configured table of COT sharing combinations corresponding to the combination, and at least one row of the configured table of COT sharing combinations indicates that COT sharing is not available.

In some embodiments, the index value corresponds to a row of a configured table of COT sharing combinations corresponding to the combination, and a bitwidth of the COT sharing information in the CG-UCI is $\lceil \log_2 C \rceil$ bits, where C is a number of combinations configured in the table.

In some embodiments, the method further comprises, after receiving the CG-UCI and before the beginning of the downlink transmission opportunity, receiving, by the base station, at least one subsequent CG-UCI from the UE during the COT. In some embodiments, each subsequent CG-UCI of the at least one subsequent CG-UCI comprises the COT sharing information indicating, at least, the downlink transmission opportunity.

In some embodiments, receiving the CG-UCI comprises receiving the CG-UCI in an uplink burst, and a switching gap between the uplink burst and the downlink transmission is: 16 μs or 25 μs if a downlink listen-before talk (LBT) procedure after the uplink burst and before the downlink transmission is a category 2 (CAT2) downlink LBT procedure; and at most 16 μs if the downlink LBT procedure is a category 1 (CAT1) downlink LBT procedure without LBT being performed in the switching gap.

According to another embodiment, there is disclosed a base station apparatus comprising at least one processor. The base station further comprises at least one processor-readable storage device comprising stored thereon processor-executable instructions that, when executed by the at least one processor, cause the at least one processor to, at least, receive a configured-grant uplink control information (CG-UCI) from a user equipment (UE) during a channel occupancy time (COT) initiated by the UE in a shared spectrum, the CG-UCI comprising COT sharing information, the COT sharing information indicating, at least, an index value corresponding to a combination of: an indication of an offset to a beginning of a downlink transmission opportunity during the COT; an indication of a duration of the downlink transmission opportunity during the COT; and an indication of a channel access priority class (CAPC) value used by the UE to initiate the COT. The processor-executable instructions, when executed by the at least one processor, further cause the at least one processor to, at least, transmit a downlink transmission to the UE within the downlink transmission opportunity and in accordance with the COT sharing information in the transmitted CG-UCI.

In some embodiments, the indication of the duration indicates, at least, a number of time slots of the downlink transmission opportunity.

In some embodiments, the indication of the offset indicates, at least, a number of time slots of the COT from transmission of the CG-UCI to the beginning of the downlink transmission opportunity.

In some embodiments, the processor-executable instructions that, when executed by the at least one processor, cause the at least one processor to transmit the downlink transmission comprise processor-executable instructions that, when executed by the at least one processor, cause the at least one processor to transmit the downlink transmission in at least one physical downlink shared channel (PDSCH).

In some embodiments, the processor-executable instructions that, when executed by the at least one processor, cause the at least one processor to receive the CG-UCI comprise processor-executable instructions that, when executed by the at least one processor, cause the at least one processor to receive a physical uplink shared channel (PUSCH) comprising the CG-UCI.

In some embodiments, the index value corresponds to a row of a configured table of COT sharing combinations, the row corresponding to the combination, and at least one row of the configured table of COT sharing combinations indicates that COT sharing is not available.

In some embodiments, the index value corresponds to a row of a configured table of COT sharing combinations, the row corresponding to the combination, and a bitwidth of the COT sharing information in the CG-UCI is $\lceil \log_2 C \rceil$ bits, where C is a number of combinations configured in the table.

In some embodiments, the processor-executable instructions, when executed by the at least one processor, further cause the at least one processor to, at least, after receiving the CG-UCI and before the beginning of the downlink transmission opportunity, receive at least one subsequent CG-UCI from the UE during the COT. In some embodiments, each subsequent CG-UCI of the at least one subsequent CG-UCI comprises the COT sharing information indicating, at least, the downlink transmission opportunity.

In some embodiments, the processor-executable instructions that, when executed by the at least one processor, cause the at least one processor to receive the CG-UCI comprise processor-executable instructions that, when executed by the at least one processor, cause the at least one processor to receive the CG-UCI in an uplink burst such that a switching gap between the uplink burst and the downlink transmission is: 16 μs or 25 μs if a downlink listen-before talk (LBT) procedure after the uplink burst and before the downlink transmission is a category 2 (CAT2) downlink LBT procedure; and at most 16 μs if the downlink LBT procedure is a category 1 (CAT1) downlink LBT procedure without LBT being performed in the switching gap.

Other aspects and features will become apparent to those ordinarily skilled in the art upon review of the following description of illustrative embodiments in conjunction with the accompanying figures.

DETAILED DESCRIPTION OF ILLUSTRATIVE EMBODIMENTS

For illustrative purposes, specific example embodiments will be explained in greater detail below in conjunction with the figures. It should be appreciated, however, that the present disclosure provides many applicable concepts that can be embodied in a wide variety of specific contexts. The specific embodiments discussed are merely illustrative and do not limit the scope of the present disclosure.

In this disclosure, configured-grant transmissions refer to data transmissions that are performed without communicating grant-based signaling in a dynamic control channel, such as a physical downlink control channel (PDCCH). Configured-grant transmissions can include uplink or downlink transmissions, and may encompass Semi-Persistently Scheduled (SPS) transmissions, and should be interpreted as such unless otherwise specified.

Communication System

Figure 1:
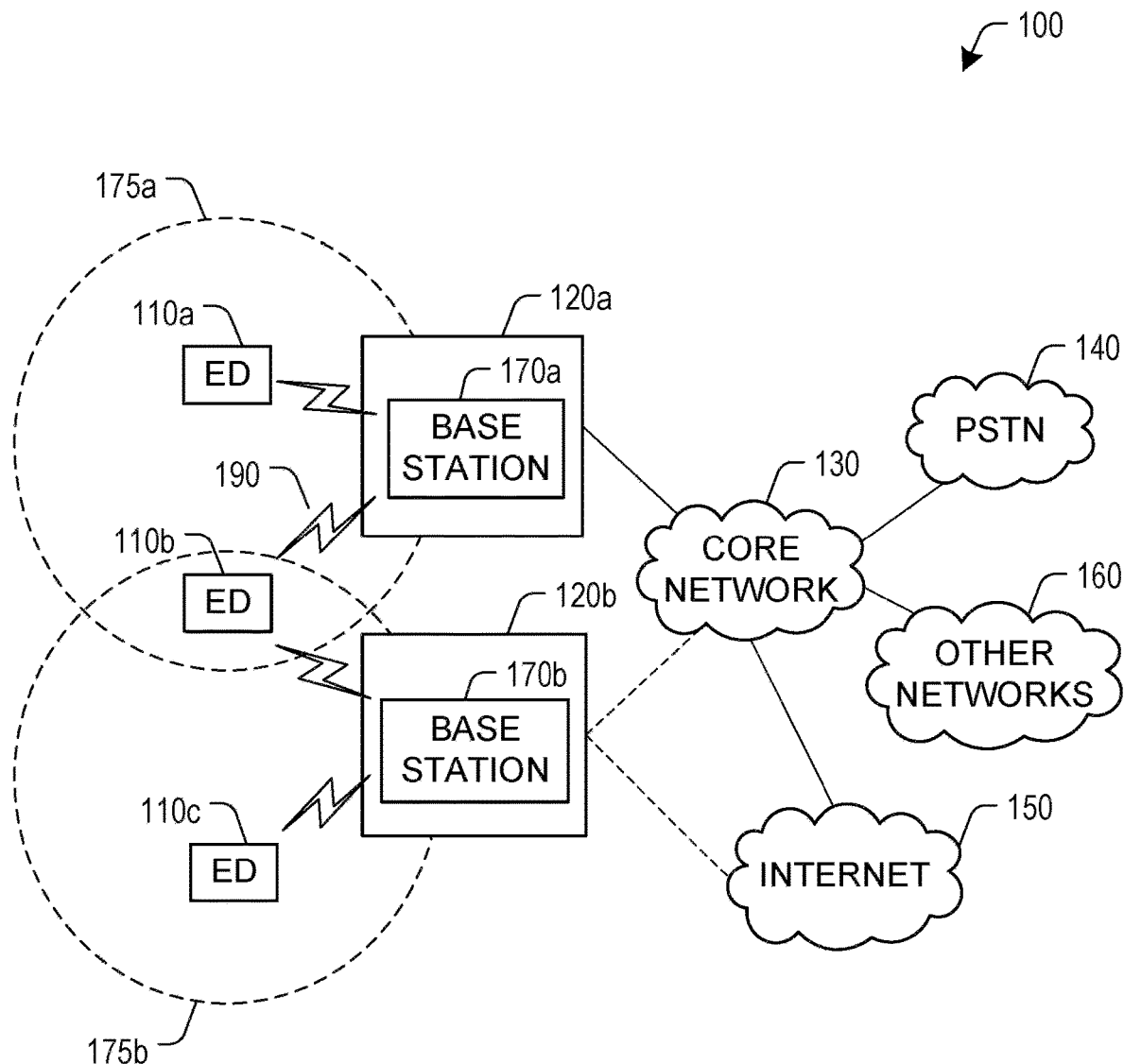
FIG. 1 is a schematic diagram of a communication system according to one embodiment.

FIG. 1 illustrates an example communication system 100. In general, the system 100 enables multiple wireless or wired user devices to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 100 includes electronic devices (EDs) or user equipments (UEs) 110a-110c, radio access networks (RANs) 120a-120b, a core network 130, a public switched telephone network (PSTN) 140, the Internet 150, and other networks 160. While certain numbers of these components or elements are shown in FIG. 1, any number of these components or elements may be included in the system 100.

The UEs 110a-110c are configured to operate and/or communicate in the system 100. For example, the UEs 110a-110c are configured to transmit and/or receive via wireless or wired communication channels. Each UE 110a-110c represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 120a-120b include base stations 170a-170b, respectively. Each base station 170a-170b is configured to interface wirelessly with one or more of the UEs 110a-110c to enable access to a backhaul network. The backhaul network in FIG. 1 includes the core network 130, the PSTN 140, the Internet 150, and/or the other networks 160. For example, the backhaul network can include a 5G communication system network or a future next evolution system network. For example, the base stations 170a-170b may include (or be) one or more of a base transceiver station (BTS), a Node-B (NodeB), an evolved NodeB (eNodeB), a gigabit NodeB (gNodeB), a Home NodeB, a Home eNodeB, a Home gNodeB, a site controller, an access point (AP), or a wireless router. The UEs 110a-110c are configured to interface and communicate with the Internet 150 and may access the core network 130, the PSTN 140, and/or the other networks 160.

In the embodiment shown in FIG. 1, the base station 170a forms part of the RAN 120a, which may include other base stations, elements, and/or devices. Also, the base station 170b forms part of the RAN 120b, which may include other base stations, elements, and/or devices. The base station 170a operates to transmit and/or receive wireless signals within a particular coverage area or cell 175a, and the base station 170b operates to transmit and/or receive wireless signals within a particular coverage area or cell 175b. In some embodiments, multiple-input multiple-output (MIMO) technology may be employed having multiple transceivers for each cell.

The base stations 170a-170b communicate with one or more of the UEs 110a-110c over one or more air interfaces 190 using wireless communication links. The air interfaces 190 may utilize any suitable radio access technology.

It is contemplated that the system 100 may use multiple channel access functionality, including such schemes as described above. In particular embodiments, the base stations and UEs implement 3G, long-term evolution (LTE), LTE-A, LTE-B, and/or 5G. Of course, other multiple access schemes and wireless protocols may be utilized.

The RANs 120a-120b are in communication with the core network 130 to provide the UEs 110a-110c with voice, data, application, voice over internet protocol (VOIP), or other services. The RANs 120a-120b and/or the core network 130 may be in direct or indirect communication with one or more other RANs (not shown). The core network 130 may also serve as a gateway access for other networks (such as the PSTN 140, the Internet 150, and the other networks 160). In addition, some or all of the UEs 110a-110c may include functionality for communicating with different wireless networks over different wireless links using different wireless technologies and/or protocols. Instead of wireless communication (or in addition thereto), the UEs 110a-110c may communicate via wired communication channels to a service provider or switch (not shown), and to the internet 150.

Although FIG. 1 illustrates one example of a communication system, various changes may be made to FIG. 1. For example, the communication system 100 could include any number of UEs, base stations, networks, or other components in any suitable configuration.

Figure 2A:
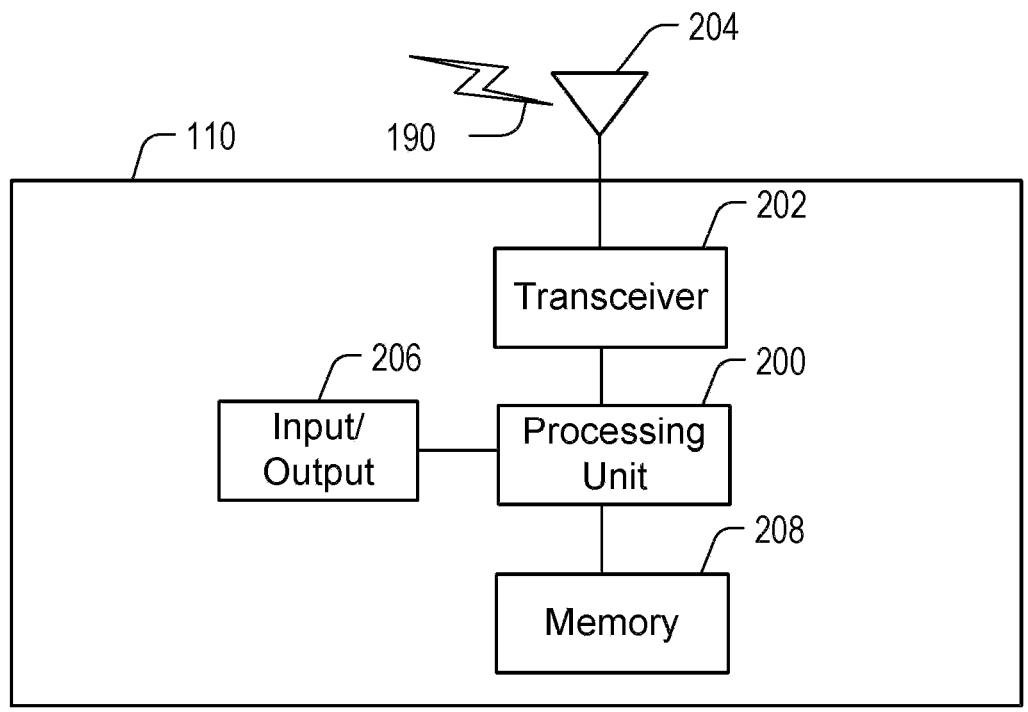
FIG. 2A is a schematic illustration of a user equipment (UE) of the communication system of FIG. 1.
Figure 2B:
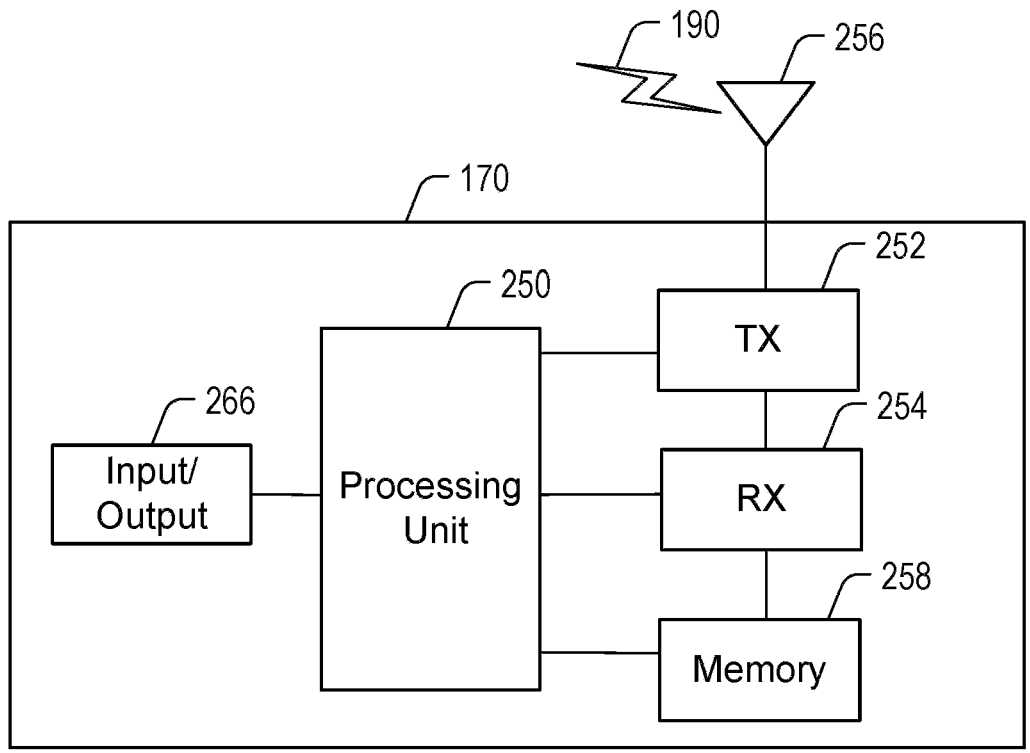
FIG. 2B is a schematic illustration of a base station of the communication system of FIG. 1.

FIGS. 2A and 2B illustrate example devices that may implement the methods and teachings according to this disclosure. In particular, FIG. 2A illustrates an example UE 110 corresponding to any of the UEs 110a-110c, and FIG. 2B illustrates an example base station 170 corresponding to either of the base stations 170a-170b. These components could be used in the system 100 or in any other suitable system.

As shown in FIG. 2A, the UE 110 includes at least one processing unit 200. The processing unit 200 implements various processing operations of the UE 110. For example, the processing unit 200 could perform signal coding, data processing, power control, input/output processing, or any other functionality enabling the UE 110 to operate in the system 100. The processing unit 200 also supports the methods and teachings described in more detail below. Each processing unit 200 includes any suitable processing or computing device configured to perform one or more operations. Each processing unit 200 could, for example, include a microprocessor, microcontroller, digital signal processor, field programmable gate array, or an application-specific integrated circuit.

The UE 110 also includes at least one transceiver 202. The transceiver 202 is configured to modulate data or other content for transmission by at least one antenna 204 or network interface controller (NIC). The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the UE 110, and one or multiple antennas 204 could be used in the UE 110. Although shown as a single functional unit, a transceiver 202 could also be implemented using at least one transmitter and at least one separate receiver.

The UE 110 further includes one or more input/output devices 206 or interfaces (such as a wired interface to the Internet 150). The input/output devices 206 facilitate interaction with a user or other devices (network communications) in the network. Each input/output device 206 includes any suitable structure for providing information to or receiving/providing information from a user, such as a speaker, microphone, keypad, keyboard, display, or touch screen, including network interface communications.

In addition, the UE 110 includes at least one memory 208. The memory 208 stores instructions and data used, generated, or collected by the UE 110. For example, the memory 208 could store software or firmware instructions executed by the processing unit(s) 200 and data used to reduce or eliminate interference in incoming signals. Each memory 208 includes any suitable volatile and/or non-volatile storage and retrieval device(s). Any suitable type of memory may be used, such as random-access memory (RAM), read-only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, at least one memory 258, and one or more input/output devices or interfaces 266. A scheduler, which would be understood by one skilled in the art, could also be coupled to the processing unit 250. The scheduler could be included within or operated separately from the base station 170. The processing unit 250 implements various processing operations of the base station 170, such as signal coding, data processing, power control, input/output processing, or any other functionality. The processing unit 250 can also support the methods and teachings described in more detail below. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more UEs or other devices. Each receiver 254 includes any suitable structure for processing signals received wirelessly or by wire from one or more UEs or other devices. Although shown as separate transmitter 252 and receiver 254, these two devices could be combined as a transceiver. Each antenna 256 includes any suitable structure for transmitting and/or receiving wireless or wired signals. While a common antenna 256 is shown here as being coupled to the transmitter 252, one or more antennas 256 could be coupled to the receiver 252, allowing separate antennas 256 to be coupled to the transmitter and the receiver as separate components. Each memory 258 includes any suitable volatile and/or non-volatile storage and retrieval device(s). Each input/output device 266 facilitates interaction with a user or other devices (network communications) in the network. Each input/output device 266 includes any suitable structure for providing information to or receiving/providing information from a user, including network interface communications.

Configured-Grant Transmissions

The base stations 170 are configured to support wireless communication with the UEs 110a-110c, which may each send configured-grant uplink transmissions. The UEs 110a-110c may be configured for configured-grant transmission, for example by configured-grant resource pre-configuration at the UE connection setup or by configured-grant resource configuration or re-configuration from an update during operation. For example, configured-grant resources can be configured for UEs by broadcast or multi-cast signaling in some embodiments. Two or more configured-grant transmissions can share the same configured resources. Furthermore, a grant-based transmission can use dedicated resources or can share resources (fully or partially) with configured-grant resources in a time interval.

Any of the configured-grant and grant-based transmissions may, in some embodiments, be used for any application traffic or services type, depending on the associated application requirements and quality of service (QOS). Configured-grant transmission can be used, for example, for: ultra-reliable low latency communication (URLLC) traffic to satisfy the low latency requirement; enhanced mobile broadband (eMBB) traffic with short packets to save signaling overhead; and eMBB traffic to enhance resource utilization and spectrum efficiency.

A numerology is defined as a set of physical-layer parameters of an air interface that are used to communicate a particular signal. For orthogonal frequency-division multiplexing (OFDM)-based communication, a numerology may be described in terms of at least subcarrier spacing (SCS) and OFDM symbol duration, and may also be defined by other parameters such as fast Fourier transform (FFT) and/or inverse FFT (IFFT) length, transmission time slot length, and cyclic prefix (CP) length or duration. In general, numerologies used for configured-grant UL transmissions in the unlicensed spectrum in accordance with the present disclosure may be selected so as to support certain functionality.

One UE or a group of UEs may have a group identifier (ID) or radio network temporary ID (RNTI) to share the same parameter or resource configuration, and an RNTI may be a grant-free RNTI (GF-RNTI) or a grant-based RNTI (GB-RNTI). The group ID can be pre-configured, or dynamically configured to each UE. The parameter or resource configuration to the UE(s) with the group ID can be done by semi-static or dynamic signaling, for example. The group ID can be used for resource deactivation or activation for the UEs in the group, for example. The resources being activated or deactivated can include frequency, time, and reference signal (RS) associated with each UE in the group.

The associated resources configured for a UE or a group of UEs can include any or all of the following.

1) Frequency resources in a transmission time interval (TTI), e.g. a symbol, mini-slot or slot. In one example, a physical resource block (PRB) scheme is provided. The PRB scheme indicates physical starting frequency resource block (RB) and size of the RB allocation. For UL transmission in an unlicensed cell in particular, the PRB scheme may alternatively indicate one or more frequency interlaces selected from a set of frequency interlaces pre-defined over the unlicensed cell or a bandwidth part (BWP) thereof. If the BWP is a wideband (WB) BWP, i.e., comprises more than one contiguous unlicensed channel (also known as sub-bands), the PRB scheme may further indicate either a sub-band index or a starting PRB and a size of the RB allocation within the one or more frequency interlaces.

2) Time resources, including starting/ending position of one data transmission time interval. For example, TTI can be one symbol, mini-slot, or slot.

3) Reference signal (RS) or RS configuration, where each UE can be configured with one or more reference signals (RSS) e.g. demodulation reference signals (DMRSs) depending on scenarios involved. For a group of UEs, each UE may or may not have a different RS or have a different set of RSs. Note that different RSs can be orthogonal or non-orthogonal to each other depending on an application, e.g., such as URLLC application or massive machine-type communication (mMTC) application.

4) One or more hybrid automatic repeat request (HARQ) process IDs per UE.

5) One or more modulation and coding schemes (MCSs) per UE, where a grant-free UE can indicate explicitly or implicitly which MCS to use for a transmission.

6) Number of grant-free transmission repetitions K, one or more K values can be configured for a UE, where which K value to use depends on certain rule taking into account UE channel conditions, service types, etc.

7) Power control parameters, including power ramping step size (e.g., for a UE).

8) Other parameters, including information associated with general grant-based data and control transmissions. Note that sometimes, a subset of grant-free resources can be referred to as "fixed" or "reserved" resources; whereas a subset of grant-based resources can be referred to as "flexible" resources, which can be dynamically scheduled by a base station.

One type of transmission with configured grant (TCG) for new radio (NR), referred to as Type 1 NR TCG, includes using radio resource control (RRC) signaling to provide configuration information to a UE. Examples of configuration information include, but are not limited to, periodicity, offset, time-frequency allocation, UE-specific demodulation reference signals (DMRS) configuration, modulation coding scheme/transmit block size (MCS/TBS), number of repetitions (K), and power control.

In a second type, referred to as Type 2 NR TCG, RRC signaling can be used to provide a UE some of the configuration information, and other configuration information is provided to the UE in activation downlink control information (DCI). Examples of the configuration information that might be provided in RRC signaling include, but are not limited to, periodicity, power control, number of repetitions (K), and MCS/TBS. Examples of configuration information that may be provided in the activation DCI include, but are not limited to, offset, time-frequency allocation, MCS/TBS and UE-specific DMRS configuration information.

With regard to time-domain resource allocation for the configured grant transmission in unlicensed spectrum, the following two parameters are configured through RRC signaling for both Type 1 and Type 2 identified above.

K-repetition: K={1, 2, 4, 8} consecutive transmissions of the same transmit block (TB) on the resources configured for transmission of the physical uplink shared channel (PUSCH). For the operation of NR in the unlicensed spectrum (NR-U), the K repetitions of the same TB may or may not occur on consecutive CG PUSCH resources.

Periodicity: The following periodicities are supported depending on the configured subcarrier spacing:
  15 kHz: 2, 7, n×14, where n∈{1, 2, 4, 5, 8, 10, 16, 20, 32, 40, 64, 80, 128, 160, 320, 640};
  30 kHz: 2, 7, n×14, where n∈{1, 2, 4, 5, 8, 10, 16, 20, 32, 40, 64, 80, 128, 160, 256, 320, 640, 1280};
  60 kHz with normal CP: 2, 7, n×14, where n∈{1, 2, 4, 5, 8, 10, 16, 20, 32, 40, 64, 80, 128, 160, 256, 320, 512, 640, 1280, 2560}; and
  60 kHz with extended cyclic prefix (ECP): 2, 6, n×12, where n∈{1, 2, 4, 5, 8, 10, 16, 20, 32, 40, 64, 80, 128, 160, 256, 320, 512, 640, 1280, 2560}.

The following two parameters are configured via RRC for Type 1 and via activation DCI for Type 2:
  timeDomainAllocation: Allocation of configured uplink grant in time domain which indicates a table entry containing startSymbolAndLength; and
  timeDomainOffset: Offset of a resource with respect to SFN=0 in time domain for Type 1, and with respect to the transmission timing of the activation DCI for Type 2.

Unlicensed Spectrum

Given the scarcity and expense of bandwidth in the licensed spectrum, and the increasing demand for data transmission capacity, there is increasing interest in offloading at least some communication traffic, such as uplink communication traffic, to the unlicensed spectrum, which may be equivalent to a "shared spectrum". For example, there has been significant interest in the unlicensed 5 GHz spectrum in which many Wireless Local Area Networks (WLANs) operate. Accordingly, in order to operate in this spectrum, efficient and fair coexistence with WLANs, along with compliance with region-specific unlicensed spectrum regulations, may be necessary.

Before a UE can access unlicensed spectrum to transmit on an unlicensed spectrum sub-band, the UE performs a listen-before talk (LBT) operation (for example including initial clear channel assessment (ICCA) and an extended clear channel assessment (ECCA)) in order to check that the channel is idle before transmitting. A sub-band of an unlicensed spectrum band may include a group of frequency resources that includes one or more unlicensed channels as defined by the IEEE 802.11 standard in the geographical region of operation, or one or more bandwidth parts (BWPs) as defined by 3GPP standards, for example.

In regions such as Europe and Japan, devices attempting to access the unlicensed spectrum have to comply with either a load-based equipment (LBE) LBT procedure or a frame-based equipment (FBE) LBT procedure.

In the LBE LBT procedure, a device attempting to access the unlicensed spectrum can start transmitting at an arbitrary time after a successful clear channel assessment (CCA). The CCA mechanism employed in such LBE LBT procedures may be the same CCA mechanism employed in WLAN, i.e. carrier sense multiple access with collision avoidance (CSMA/CA), or it may be based on an energy-detection-based CCA. For example, an energy-detection-based CCA may utilize a random back-off to determine the size of a contention window, and a respective maximum channel occupancy time (MCOT) that determines the maximum amount of time that a device may occupy in the unlicensed channel once it has successfully contended for a transmission opportunity.

In FBE LBT procedures, a device attempting to access the unlicensed spectrum can start transmitting only at periodic instants after a short successful energy-detection-based CCA. The minimum time between such periodic instants is the fixed frame period, which encompasses the channel occupancy time of the transmission and an idle period. Under the regulatory requirements, the channel occupancy may be between 1 and 10 milliseconds (ms) and the idle period must be at least 5% of the channel occupancy time and lower bounded by 100 microseconds (μs). In addition, under the regulatory requirements, devices employ an energy-detection-based CCA in which a channel is determined to be busy if the total energy detected in the channel is greater than a CCA threshold value that is upper bounded by a function of the transmit power of the device. In particular, the upper bound of the CCA threshold has been regulated as follows:

$$\text{CCA Threshold} \geq -73 \text{ dBm/MHz} + (23 - \max \text{Tx EIRP}) \text{ [dBm]},$$

where max Tx EIRP is a device's maximum transmit equivalent isotropically radiated power (EIRP). As a result, the higher the max Tx power and/or the antenna gain, the lower the CCA threshold that is allowed. Under the current regulatory requirements, the CCA period must be at least 9 microseconds (μs) long, with 25 μs being typical.

If individual UEs accessed the unlicensed spectrum individually without coordination, it could create delay and potentially deteriorate performance. For example, If UEs perform independent LBT procedures, they may either start transmitting uplink data or send a reservation signal to ensure that other devices do not occupy an unlicensed channel before they are able to transmit. In both situations, if no coordination exists between UEs in terms of aligning their CCAs, sending of the reservation signals or starting of their uplink transmissions, then the channel may appear to be busy for other UEs, which can increase the latency of uplink transmission for those other UEs.

Configured-Grant Uplink Control Information

Figure 3:
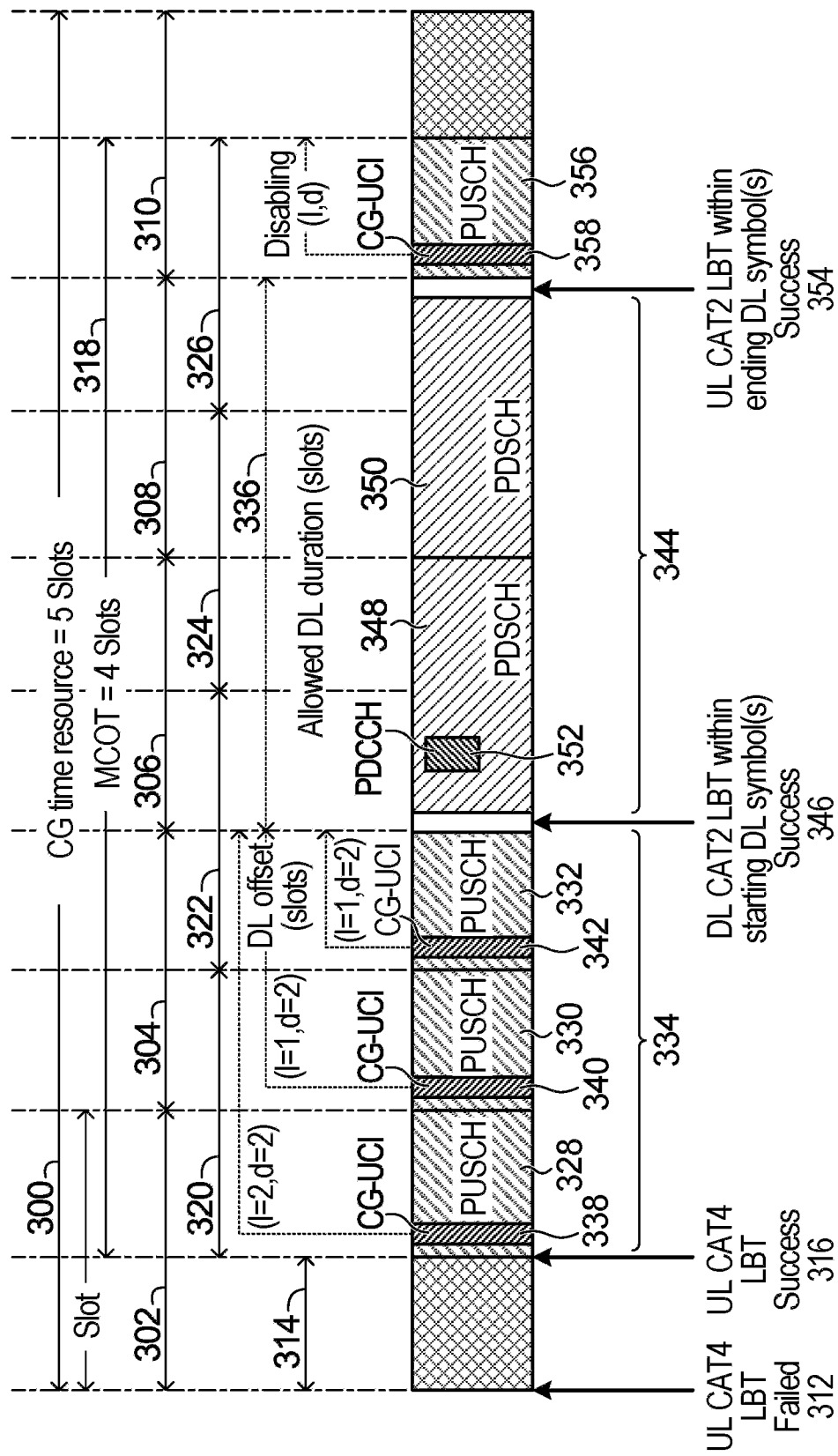
FIGS. 3-10 are schematic illustrations of examples of time resources for configured grant by the UE of FIG. 2A in an unlicensed spectrum in a cell of the base station of FIG. 2B according to various embodiments.

FIG. 3 illustrates an example of a time resource 300 for configured grant transmission by the UE 110a in an unlicensed spectrum in the cell 175a of the base station 170a according to one embodiment, although alternative embodiments may involve different UEs, different cells, and/or different base stations.

In the example of FIG. 3, the time resource 300 includes five time slots 302, 304, 306, 308, and 310. The UE 110a attempted to initiate channel occupancy time (COT) for an uplink transmission to the base station 170a in the time resource 300 by a first uplink (UL) LBT procedure 312 at the beginning of the time slot 302. In this example, the first UL LBT procedure 312 failed because of a "busy" assessment. The UE 110a attempted again to initiate COT for an uplink transmission to the base station 170a in the time resource 300 by proceeding with a second UL LBT procedure 316 towards the next potential PUSCH, the starting point of which is after a delay 314 from the beginning of the time slot 302. In the embodiment shown, the first UL LBT procedure 312 and the second UL LBT procedure 316 are category 4 (CAT4) UL LBT procedures that involve a random back-off, but in alternative embodiments, a UE may attempt to initiate COT using other procedures.

In this example, the second UL LBT procedure 316 was successful, and the UE 110a initiated COT having a MCOT 318 of four time slots 320, 322, 324, and 326 in the time resource 300. The COT in the MCOT 318 is therefore a COT initiated by the UE 110a. During the COT in the MCOT 318, the UE 110a transmits an uplink transmission to the base station 170a in a physical uplink shared channel (PUSCH) 328 in the time slot 302, in a PUSCH 330 in the time slot 304, and in a PUSCH 332 in the time slot 304. The PUSCHs 328, 330, and 332 therefore form an uplink burst 334 in an uplink transmission from the UE 110a to the base station 170a in the time resource 300 in the unlicensed spectrum in the cell 175a of the base station 170a.

However, in this example, the uplink burst 334 does not extend into the time slots 306 and 308 that are within the MCOT 318. Therefore, the uplink burst 334 includes indications of a downlink transmission opportunity 336 (or, more generally, a transmission opportunity) in the time slots 306 and 308 during the COT in the MCOT 318. The downlink transmission opportunity 336 begins two time slots after the time slot 302, which is one time slot after the time slot 304, and has a duration of two time slots 306 and 308.

In this example, the PUSCH 328 in the time slot 302 includes a configured-grant uplink control information (CG-UCI) 338. In general, a CG-UCI as described herein may include one or more of: a HARQ ID, a new data indicator (NDI), a redundancy version (RV), COT sharing information as described below, or other information such as a UE ID.

The COT sharing information of the CG-UCI 338 includes an indication that the downlink transmission opportunity 336 begins two time slots after the time slot 302, indicated by l=2 in FIG. 3. More generally, l is a "DL offset" that may indicate a number of time slots of COT from transmission of the CG-UCI 338 to the beginning of the downlink transmission opportunity 336. The COT sharing information of the CG-UCI 338 also includes an indication that the downlink transmission opportunity 336 has a duration of two time slots, indicated by d=2 in FIG. 3. More generally, d may indicate a duration of the downlink transmission opportunity 336 as a number of time slots of the downlink transmission opportunity 336. In general, an indication in a CG-UCI as described herein may be an indication encoded in one or more bit fields of the CG-UCI.

Further, in this example, the PUSCH 330 in the time slot 304 includes a CG-UCI 340, and the COT sharing information of the CG-UCI 340 includes an indication that the downlink transmission opportunity 336 begins one time slot after the time slot 304, indicated by the DL offset l=1 in FIG. 3. The COT sharing information of the CG-UCI 340 also includes an indication that the downlink transmission opportunity 336 has a duration of two time slots, again indicated by d=2 in FIG. 3. Further, in this example, the PUSCH 332 in the time slot 304 includes a CG-UCI 342, and the COT sharing information of the CG-UCI 342 includes an indication that the downlink transmission opportunity 336 begins one time slot after the time slot 304, again indicated by l=1 in FIG. 3. The COT sharing information of the CG-UCI 338 also includes an indication that the downlink transmission opportunity 336 has a duration of two time slots, again indicated by d=2 in FIG. 3. The values of l and d in the embodiment of FIG. 3 are examples only. Alternative embodiments may include different indications of a time delay (or offset) to a beginning of a downlink transmission opportunity, and alternative embodiments may include different indications of a duration of the downlink transmission opportunity.

Therefore, more generally, the COT sharing information of each of the CG-UCIs 338, 340, and 342 identifies the downlink transmission opportunity 336 to the base station 170a to allow the base station 170a to share the COT in the MCOT 318. In the embodiment shown, the COT sharing information of each of the CG-UCIS 338, 340, and 342 identifies the downlink transmission opportunity 336 by including an indication l of a time delay (or offset) from the transmission of the CG-UCI to the beginning of the downlink transmission opportunity 336 and an indication d of a duration of the downlink transmission opportunity 336, although alternative embodiments may differ.

In the embodiment shown, the indication l indicates a number of time slots from the time slot of the CG-UCI to the time slot of the beginning of the downlink transmission opportunity, and may be referred to as an indication of an offset from the transmission of the CG-UCI to the beginning of the downlink transmission opportunity 336. However, alternative embodiments may differ. For example, alternative embodiments may indicate a time delay (or offset) to a beginning of a downlink transmission opportunity other than by indicating a number of time slots and other than by indicating a time from transmission of the CG-UCI.

Further, in the embodiment shown, the indication d indicates a number of time slots of the downlink transmission opportunity. However, alternative embodiments may differ and may, for example, indicate a duration of a downlink transmission opportunity other than a number of time slots of the downlink transmission opportunity.

In some embodiments, the COT sharing information of a CG-UCI may include an identifier of a combination in an ordered set of combinations of (l, d). In general, ordered sets of combinations of (l, d) as described herein may be configured or predefined. An identifier of a combination in an ordered set of combinations of (l, d) identifies the l and the d of the combination and therefore identifies both the time delay from the transmission of the CG-UCI to the beginning of the downlink transmission opportunity, and the duration of the downlink transmission opportunity. In this example, the CG-UCI 338 may include a combination index value (CIV) or other identifier identifying the combination (l=2, d=2) in an ordered set of combinations of (l, d), and the CG-UCIs 340 and 342 may each include a CIV or other identifier identifying the combination (l=1, d=2) in the ordered set of combinations of (l, d).

This example includes three CG-UCIs 338, 340, and 342, which may avoid ambiguity if the base station 170*a* fails to detect some of the CG-UCIs. However, alternative embodiments may include more or fewer CG-UCIs. However, in alternative embodiments, some of the CG-UCIs included in the UL burst may indicate combinations of (l, d) that correspond to another forthcoming DL transmission opportunity, for example when multiple DL transmission opportunities are not consecutive in time and the UE may resume the CG UL transmission between the DL transmission opportunities.

In the embodiment shown, after the uplink burst 334 from the UE 110*a* to the base station 170*a*, the base station 170*a* initiates a downlink transmission 344 from the base station 170*a* to the UE 110*a* in the downlink transmission opportunity 336 after a downlink (DL) LBT procedure 346 at the beginning of the time slot 306. To accommodate the DL LBT procedure 346, and to accommodate other LBT procedures that switch from an uplink transmission to a downlink transmission, the base station 170*a* may blank one or more downlink symbols based on the numerology or SCS of the active BWP to provide a switching gap between the uplink transmission and the downlink transmission.

In other words, in response to the COT sharing information of one, more than one, or all of the CG-UCIs 338, 340, and 342, the base station 170*a* transmits, and the UE 110*a* receives, the downlink transmission 344 in the downlink transmission opportunity 336 identified by the COT sharing information of the CG-UCIs 338, 340, and 342. Therefore, the COT sharing information of one, more than one, or all of the CG-UCIs 338, 340, and 342 allow the base station 170*a* to share the COT in the MCOT 318 by transmitting the downlink transmission 344 to the UE 110*a* in the downlink transmission opportunity 336 identified by the COT sharing information of the CG-UCIs 338, 340, and 342.

In the embodiment shown, the DL LBT procedure 346 is a category 2 (CAT2) DL LBT procedure, which does not involve a random back-off, but in alternative embodiments, the base station may initiate a downlink transmission using other procedures such as CAT1 (no LBT) procedure, for instance when the gap between UL and DL is 16 µs or less. In this example, the DL LBT procedure 346 was successful, and the downlink transmission 344 includes a first physical downlink shared channel (PDSCH) 348 in the time slot 306 and a second PDSCH 350 in the time slot 308. In this embodiment, and in some other embodiments, timing of the downlink transmission 344 is chosen such that the time slot 306 in which the downlink transmission 344 begins includes a physical downlink control channel (PDCCH) 352, but alternative embodiments may differ.

In this example, the downlink transmission 344 is within the time resource 300 and within the MCOT 318. However, in alternative embodiments, a downlink transmission may extend beyond a time resource as described herein.

In this example, the UE 110*a* attempts to resume uplink transmission in the COT of the MCOT 318 by a third UL LBT procedure 354 before the end of the time slot 308. To accommodate the UL LBT procedure 354, and to accommodate other LBT procedures that switch from a downlink transmission to an uplink transmission, the base station 170*a* may blank one or more downlink symbols based on the numerology or SCS of the active BWP to provide a switching gap between the downlink transmission and the uplink transmission.

In the embodiment shown, the third UL LBT procedure 354 is a CAT2 UL LBT procedure, but in alternative embodiments, a UE may attempt to resume uplink transmission using other procedures. In this example, the third UL LBT procedure 354 was successful, and the UE 110*a* resumes uplink transmission in the COT of the MCOT 318 by transmitting a PUSCH 356 in the time slot 310. The PUSCH 356 includes a CG-UCI 358, and the COT sharing information of the CG-UCI 358 includes a "disabling" indication indicating no downlink transmission opportunity thereafter.

Figure 4:
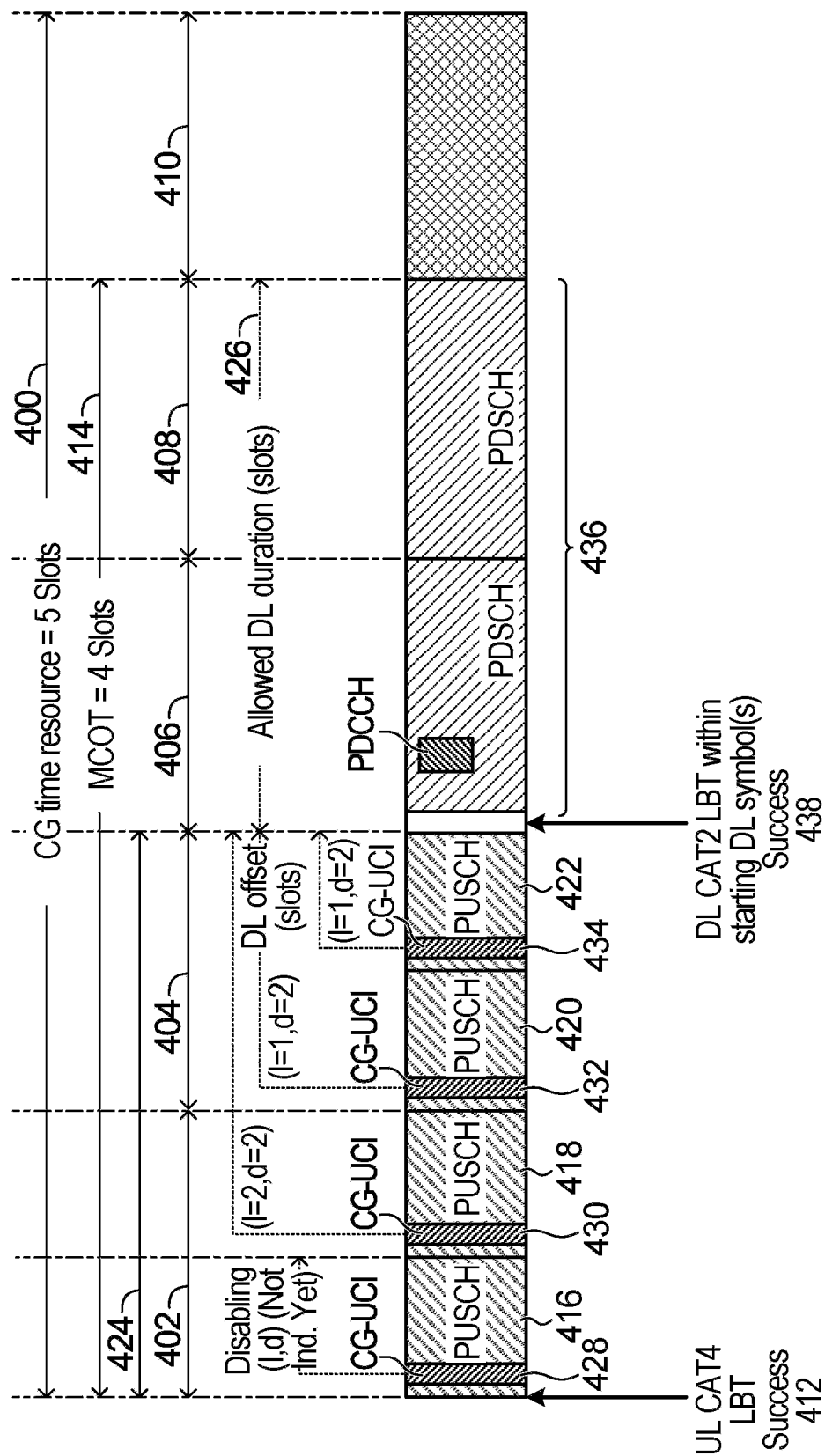

FIG. 4 illustrates another example of a time resource 400 for configured grant by the UE 110*a* in an unlicensed spectrum in the cell 175*a* of the base station 170*a* according to one embodiment, although alternative embodiments may involve different UEs, different cells, and/or different base stations.

In the example of FIG. 4, the time resource 400 includes five time slots 402, 404, 406, 408, and 410, and the UE 110*a* attempted to initiate COT for an uplink transmission to the base station 170*a* in the time resource 400 by an UL LBT procedure 412 at the beginning of the time slot 402. In this example, the UL LBT procedure 412 was successful, and the UE 110*a* initiated COT having a MCOT 414 of four time slots in the time slots 402, 404, 406, and 408 in the time resource 400. During the COT in the MCOT 414, the UE 110*a* transmits an uplink transmission to the base station 170*a* in a PUSCH 416 in the time slot 402, in a PUSCH 418 in the time slot 402, in a PUSCH 420 in the time slot 404, and in a PUSCH 422 in the time slot 404. The PUSCHs 416, 418, 420, and 422 therefore form an uplink burst 424 in an uplink transmission from the UE 110*a* to the base station 170*a* in the time resource 400 in the unlicensed spectrum in the cell 175*a* of the base station 170*a*.

However, in this example, the uplink burst 424 does not extend into the time slots 406 and 408 that are within the MCOT 414. Therefore, the uplink burst 424 includes indications of a downlink transmission opportunity 426 (or, more generally, a transmission opportunity) in the time slots 406 and 408 during the COT in the MCOT 414. The downlink transmission opportunity 426 begins two time slots after the time slot 402, begins one time slot after the time slot 404, and has a duration of two time slots 406 and 408.

In this example, at the time of the PUSCH 416, the UE 110*a* may not have identified an end of the uplink burst 424 in the time slot 404 and therefore may not have identified a beginning of the downlink transmission opportunity 426 in the time slot 406. Therefore, in this example, the PUSCH 416 in the time slot 402 includes a CG-UCI 428, and the COT sharing information of the CG-UCI 428 includes a "disabling" indication indicating no downlink transmission opportunity, similar to the COT sharing information of the CG-UCI 358 shown in FIG. 3.

However, in this example, at the time of the PUSCH 418, the UE 110*a* has identified the end of the uplink burst 424 in the time slot 404 and has identified the beginning of the downlink transmission opportunity 426 in the time slot 406. Therefore, in this example, the PUSCH 418 includes a CG-UCI 430, and the COT sharing information of the CG-UCI 430 includes an indication that the downlink transmission opportunity 426 begins two time slots after the time slot 402, indicated by l=2 in FIG. 4. The COT sharing information of the CG-UCI 430 also includes an indication that the downlink transmission opportunity 426 has a duration of two time slots, indicated by d=2 in FIG. 4. The COT sharing information of the CG-UCI 430 may therefore be similar to the COT sharing information of the COT sharing information of the CG-UCI 338 shown in FIG. 3. Further, in this example, the PUSCH 420 includes a CG-UCI 432, and the COT sharing information of the CG-UCI 432 may be similar to the COT sharing information of the CG-UCI 340 shown in FIG. 3. Further, in this example, the PUSCH 422 includes a CG-UCI 434, and the COT sharing information of the CG-UCI 434 may be similar to the COT sharing information of the CG-UCI 342 shown in FIG. 3. Again, the values of l and d in the embodiment of FIG. 4 are examples only, and alternative embodiments may include different indications of a time delay (or offset) to a beginning of a downlink transmission opportunity, and alternative embodiments may include different indications of a duration of the downlink transmission opportunity.

In the embodiment shown, after the uplink burst 424 from the UE 110a to the base station 170a, the base station 170a initiates a downlink transmission 436 from the base station 170a to the UE 110a in the downlink transmission opportunity 426 after a DL LBT procedure 438 at the beginning of the time slot 406. The DL LBT procedure 438 may be similar to the DL LBT procedure 346 shown in FIG. 3, and the downlink transmission 436 may be similar to the downlink transmission 344 shown in FIG. 3, although alternative embodiments may differ.

Indications of Offsets and Durations

In a configured-grant time resource, a MCOT of COT initiated by a UE has $N_{p,\mu}$ time slots, where p represents the channel access priority class (CAPC) used to initiate the COT and $\mu$ represents a numerology of the configured-grant time resource. For example, in some embodiments in which $\mu=1$ (30 kHz), $N_{1,1}=4$, $N_{2,1}=8$, $N_{3,1}=12$, and $N_{4,1}=12$, although alternative embodiments may differ.

In the embodiments of FIGS. 3 and 4, when COT sharing information of a CG-UCI indicates that l=0, the COT sharing information of the CG-UCI indicates a downlink transmission opportunity beginning in a same time slot as transmission of the CG-UCI. A downlink transmission in a same time slot as transmission of a CG-UCI may be described as a partial-slot downlink transmission. Also, in the embodiments of FIGS. 3 and 4, when a CG-UCI is in the first time slot of a MCOT and indicates that a downlink transmission opportunity begins in the last time slot of the MCOT, the CG-UCI indicates that $l=N_{p,\mu}-1$. Therefore, in the embodiments of FIGS. 3 and 4, values of l may range from 0 to $N_{p,\mu}-1$.

Further, in some embodiments, d=0 or another indicator may indicate a partial-slot downlink opportunity (as described below with reference to FIG. 9), and $d=N_{p,\mu}-1$ indicates a downlink opportunity in all of the remaining time slots of the MCOT after the first slot that may or may not have a partial DL transmission. Therefore, in some embodiments, values of d may range from 0 to $N_{p,\mu}-1$. Further, to maintain the downlink opportunity within the MCOT, $$l+d < N_{p,\mu}.$$

Therefore, the number of combinations of (l, d) that could be used is the number of combinations of (l, d) that satisfy $0 \le l \le N_{p,\mu}-1$, $0 \le d \le N_{p,\mu}-1$, and $l+d<N_{p,\mu}$, which is $$C_{p,\mu} = \frac{N_{p,\mu}(N_{p,\mu}+1)}{2}.$$

The $C_{p,\mu}$ combinations of (l, d) may be ordered in an ordered set of combinations of (l, d), and combinations in the ordered set of combinations of (l, d) may be identified by values of an index. Therefore, a value of an index may identify a combination in an ordered set of combinations of (l, d), and the value of an index therefore identifies the time delay, represented by the combination, from transmission of a CG-UCI to a beginning of a downlink transmission opportunity, and the value of an index also identifies the duration, represented by the combination, of the downlink transmission opportunity.

In the embodiments of FIGS. 3 and 4, each of the CG-UCIs 338, 340, 342, 358, 428, 430, 432, and 434 includes COT sharing information in addition to any other data in the CG-UCIs, and the COT sharing information includes either a "disabling" indication indicating no downlink transmission opportunity or an identifier of a combination in an ordered set of combinations of (l, d). Therefore, the number of possible values (or possible index values) of the COT sharing information of each of the CG-UCIs 338, 340, 342, 358, 428, 430, 432, and 434 for a particular p and for a particular $\mu$ is $1+C_{p,\mu}$, and the number of bits required for the COT sharing information of each of the CG-UCIs is $$B_{p,\mu} = \lceil 1 + \log_2(C_{p,\mu}) \rceil = \left\lceil 1 + \log_2\left(\frac{N_{p,\mu}(N_{p,\mu}+1)}{2}\right) \right\rceil.$$

In other words, in the embodiments of FIGS. 3 and 4, for a particular p and for a particular $\mu$, each of the CG-UCIs 338, 340, 342, 358, 428, 430, 432, and 434 may include COT sharing information encoded in at least $B_{p,\mu}$ bits, and the bits in the COT sharing information of the CG-UCIs may indicate an index value representing either a "disabling" indication indicating no downlink transmission opportunity or an identifier of a combination in an ordered set of combinations of (l, d). However, CG-UCIs according to other embodiments may differ as described below, for example.

Indications of CAPC

In the embodiments of FIGS. 3 and 4 and some other embodiments, different configured-grant resources may be used for particular respective CAPCs.

However, in some other embodiments, configured-grant resources may be used for more than one CAPC. When configured-grant resources may be used for more than one CAPC, COT sharing information in a CG-UCI may include an indicator of a CAPC p that the UE used to initiate the COT. For example, in some embodiments, COT sharing information of a CG-UCI may include two bits, a different number of bits, or a different indicator to indicate a CAPC p that the UE used to initiate the COT.

Index Values Indicating CAPC, Offset, and Duration

For a particular numerology represented by $\mu$, an index value identified in COT sharing information of a CG-UCI may be a number encoded in $B_\mu$ bits and ranging from 0 to $2^{B_\mu}-1$. In some embodiments, an index value identified in COT sharing information of a CG-UCI may identify both a CAPC p that the UE used to initiate the COT and an identifier of a combination in an ordered set of combinations of (l, d) as shown in the following example. In the following example, p=0 indicates a "disabling" indication, and for convenient reference, $\Delta_{p,\mu}$ is defined as $$\Delta_{p,\mu} = \sum_{i=0}^{p} C_{i,\mu} \text{ with } C_{0,\mu} = 1.$$ 5

| CIV Range Start | CIV Range End | CAPC p | CIV Identifies |
|---|---|---|---|
| 0 | 0 | 0 | "Disabling" indication indicating no downlink transmission opportunity |
| $C_{0,\mu} = 1$ | $C_{1,\mu}$ | 1 | One of $C_{1,\mu}$ combinations of (l, d) |
| $\Delta_{1,\mu} = C_{1,\mu} + 1$ | $C_{1,\mu} + C_{2,\mu}$ | 2 | One of $C_{2,\mu}$ combinations of (l, d) |
| $\Delta_{2,\mu} = \Delta_{1,\mu} + C_{2,\mu}$ | $C_{1,\mu} + C_{2,\mu} + C_{3,\mu}$ | 3 | One of $C_{3,\mu}$ combinations of (l, d) |
| $\Delta_{3,\mu} = \Delta_{2,\mu} + C_{3,\mu}$ | $C_{1,\mu} + C_{2,\mu} + C_{3,\mu} + C_{4,\mu}$ | 4 | One of $C_{4,\mu}$ combinations of (l, d) |
| $\Delta_{4,\mu} = \Delta_{3,\mu} + C_{4,\mu}$ | $2^{B_\mu} - 1$ | None | Reserved (if any) |

In other words, in this example, an index value of 0 indicates a "disabling" indication indicating no downlink transmission opportunity, an index value from 1 to $C_{1,\mu}$ indicates a respective combination of an ordered set of $C_{1,\mu}$ combinations of (l, d), an index value from $\Delta_{1,\mu}$ to $C_{1,\mu}+C_{2,\mu}$ indicates a respective combination of an ordered set of $C_{2,\mu}$ combinations of (l, d), and so on. In this example, p ranges from 0 to 4, so $\Delta_{4,\mu}$ CIV values are required. Therefore, the number of bits required to indicate the number C of required CIV values (where C is a number of combinations configured, and $C=\Delta_{4,\mu}$ in this example) is $B_\mu = \lceil \log_2 C \rceil$, and any index values from C to $2^{B_\mu}-1$ are unused, or reserved.

Again, alternative embodiments may differ. For example, in alternative embodiments, one or more index values or other indicators may indicate a CAPC p that the UE used to initiate the COT, a "disabling" indication indicating no downlink transmission opportunity, a time delay (or offset) to a beginning of a downlink transmission opportunity, a duration of the downlink transmission opportunity, or a combination of two or more thereof.

Indications of Offsets Within a Time Slot Including a "UL Burst End" Bit

Figure 5:
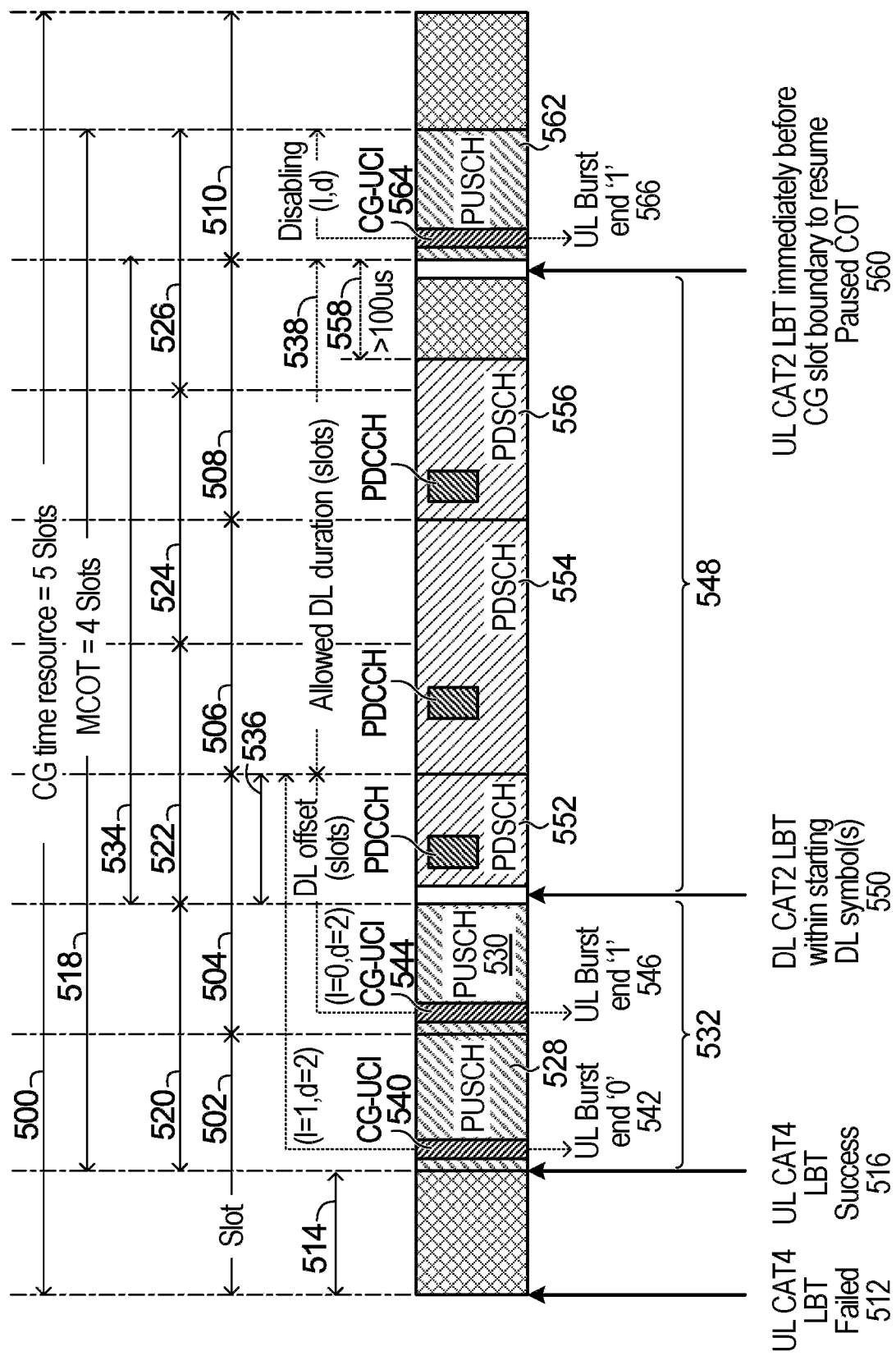

FIG. 5 illustrates an example of a time resource 500 for configured grant by the UE 110a in an unlicensed spectrum in the cell 175a of the base station 170a according to one embodiment, although alternative embodiments may involve different UEs, different cells, and/or different base stations.

In the example of FIG. 5, the time resource 500 includes five time slots 502, 504, 506, 508, and 510, and the UE 110a attempted to initiate COT for an uplink transmission to the base station 170a in the time resource 500 by a first UL LBT procedure 512 at the beginning of the time slot 502. In this example, the first UL LBT procedure 512 failed because of a "busy" assessment. The UE 110a attempted again to initiate COT for an uplink transmission to the base station 170a in the time resource 500 by proceeding with a second UL LBT procedure 516 towards the next potential PUSCH starting point, which is after a delay 514 from the beginning of the time slot 502. In the embodiment shown, the first UL LBT procedure 512 and the second UL LBT procedure 516 are CAT4 UL LBT procedures, but in alternative embodiments, a UE may attempt to initiate COT using other procedures.

In this example, the second UL LBT procedure 516 was successful, and the UE 110a initiated COT having a MCOT 518 of four time slots 520, 522, 524, and 526 in the time resource 500. The COT in the MCOT 518 is therefore COT initiated by the UE 110a. During the COT in the MCOT 518, the UE 110a transmits an uplink transmission to the base station 170a in a PUSCH 528 in the time slot 502 and in a PUSCH 530 in the time slot 504. The PUSCHs 528 and 530 therefore form an uplink burst 532 in an uplink transmission from the UE 110a to the base station 170a in the time resource 500 in the unlicensed spectrum in the cell 175a of the base station 170a.

However, in this example, the uplink burst 532 does not occupy the entire time slot 504, and the uplink burst 532 does not extend into the time slots 506 and 508 that are within the MCOT 518. Therefore, the uplink burst 532 includes indications of a downlink transmission opportunity 534 (or, more generally, a transmission opportunity) during the COT in the MCOT 518. The downlink transmission opportunity 534 includes a partial-slot portion 536 of the downlink transmission opportunity 534 in a portion of the time slot 504 that is not occupied by the uplink burst 532. The downlink transmission opportunity 534 also includes a portion 538 of the downlink transmission opportunity 534 in the time slots 506 and 508. The downlink transmission opportunity 534 begins one time slot after the time slot 502, and begins in the same time slot 504 as the PUSCH 530. Further, the portion 538 of the downlink transmission opportunity 534, which is the portion of the downlink transmission opportunity 534 that begins after the time slot 504 of the PUSCH 530, has a duration of two time slots 506 and 508 as indicated by d=2 in FIG. 5. In other words, the downlink transmission opportunity 534 has a duration of two time slots, as indicated by d=2 in FIG. 5, in addition to the partial-slot portion 536, which is the portion of the downlink transmission opportunity 534 in the same time slot 504 as the PUSCH 530.

In this example, the PUSCH 528 in the time slot 502 includes a CG-UCI 540, and the COT sharing information of the CG-UCI 540 includes an indication that the downlink transmission opportunity 534 begins one time slot after the time slot 502, again indicated by l=1 in FIG. 5. The COT sharing information of the CG-UCI 540 also includes an indication that the downlink transmission opportunity 534 has a duration of two time slots, again indicated by d=2 in FIG. 5, in addition to the partial-slot portion 536 of the downlink transmission opportunity 534 in the same time slot 504 as the PUSCH 530. The COT sharing information of the CG-UCI 540 may therefore be similar to the COT sharing information of the of CG-UCI 340 or of the CG-UCI 342 as shown in FIG. 3, except that the CG-UCI 540 also includes a "UL burst end" bit 542.

As indicated above, the COT sharing information of each of the CG-UCIs 340 and 342 may each include a CIV or other identifier identifying the combination (l=1, d=2) in an ordered set of combinations of (l, d), and the COT sharing information of the CG-UCI 540 may also include a CIV or other identifier identifying the combination (l=1, d=2) in the ordered set of combinations of (l, d). However, in the embodiment shown, in addition to the identifier of the combination (l=1, d=2) in the ordered set of combinations of (l, d), the COT sharing information of the CG-UCI 540 also includes the "UL burst end" bit 542 indicating, with a bit value of '0' in this example, that the PUSCH 528 is not the end of the uplink burst 532.

In this example, the PUSCH 530 in the time slot 504 includes a CG-UCI 544, and the COT sharing information of the CG-UCI 544 includes an indication that the downlink transmission opportunity 534 begins with a partial slot in the same time slot 504 as the CG-UCI 544, indicated by the DL offset l=0 in FIG. 5. The COT sharing information of the CG-UCI 544 also includes an indication that the downlink transmission opportunity 534 has a duration of two time slots, again indicated by d=2 in FIG. 5, in addition to the partial-slot portion 536 of the downlink transmission opportunity 534 in the same time slot 504 as the PUSCH 530. Therefore, in the embodiment shown, the COT sharing information of the CG-UCI 544 includes a CIV or other identifier identifying the combination (l=0, d=2) in an ordered set of combinations of (l, d), and in addition to the identifier of the combination (l=0, d=2) in the ordered set of combinations of (l, d), the CG-UCI 544 also includes a "UL burst end" bit 546 indicating, with a bit value of '1' in this example, that the PUSCH 530 is the end of the uplink burst 532. In other words, the "UL burst end" bit 546 is an indication that the beginning of the downlink transmission opportunity 534 is in the same time slot 504 of the COT in the MCOT 518 as the transmission of the CG-UCI 544, the "UL burst end" bit 546 is an indication that the beginning of the downlink transmission opportunity 534 is in a same time slot of the COT as an end of an uplink burst including the transmission of the CG-UCI 544, and the "UL burst end" bit 546 is an indication of a time (in this example, the time being after the PUSCH 530 including the CG-UCI 544) of the beginning of the downlink transmission opportunity 534 within the same time slot 504 as the transmission of the CG-UCI 544.

Again, in the embodiment of FIG. 5, the values of l and d, and the "UL burst end" bits 542 and 546, are examples only. Alternative embodiments may include different indications of a time delay (or offset) to a beginning of a downlink transmission opportunity. Alternative embodiments may also include different indications of a duration of the downlink transmission opportunity. Alternative embodiments may also include different indications of whether a downlink transmission opportunity is in a same time slot of the COT as transmission of CG-UCI. Alternative embodiments may also include different indications of an end of an uplink burst.

In the embodiment shown, after the uplink burst 532 from the UE 110a to the base station 170a, the base station 170a initiates a downlink transmission 548 from the base station 170a to the UE 110a in the downlink transmission opportunity 532 by a downlink DL LBT procedure 550 after the PUSCH 530 and in the time slot 504. In the embodiment shown, the DL LBT procedure 550 is a CAT2 DL LBT procedure, which does not involve a random back-off, but in alternative embodiments, base station may initiate a downlink transmission using other procedures. In this example, the DL LBT procedure 550 was successful, and the downlink transmission 548 includes a first PDSCH 552 in the time slot 504, a second PDSCH 554 in the time slot 506, and a third PDSCH 556 in the time slot 508, although alternative embodiments may differ.

In this example, an idle period 558 of at least 100 μs follows the downlink transmission 548, and after the idle period 558, the UE 110a attempts to resume uplink transmission in the COT of the MCOT 518 by a third UL LBT procedure 560 before the end of the time slot 508. In the embodiment shown, the third UL LBT procedure 560 is a CAT2 UL LBT procedure, but in alternative embodiments, a UE may attempt to resume uplink transmission using other procedures. In this example, the third UL LBT procedure 560 was successful, and the UE 110a resumes uplink transmission in the COT of the MCOT 518 by transmitting a PUSCH 562 in the time slot 510. The PUSCH 562 includes a CG-UCI 564, and the COT sharing information of the CG-UCI 564 includes a "disabling" indication that may be similar to the "disabling" indication of the CG-UCI 358. Further, in the embodiment shown, in addition to the "disabling" indication, the COT sharing information of the CG-UCI 564 includes a "UL burst end" bit 566 indicating, with a bit value of '1' in this example, that the PUSCH 562 is the end of an uplink burst including the PUSCH 562.

In the embodiment of FIG. 5, each of the time slots 502, 504, 506, 508, and 510 includes no more than two PUSCHs, and the PUSCH 530 is the only PUSCH in the time slot 504. Therefore, in the embodiment of FIG. 5, if the downlink transmission opportunity 534 begins in the time slot 504, then the time slot 504 has no capacity for another PUSCH after the PUSCH 530, and the indication that l=0 in the COT sharing information of the CG-UCI 544 of the PUSCH 530, which indicates that the downlink transmission opportunity 534 begins in the same time slot as the CG-UCI, also implies that the uplink burst 532 will end after the PUSCH 530 and that the downlink transmission opportunity 534 begins after the PUSCH 530. As a result, in the embodiment of FIG. 5—and in other embodiments in which an indication, in COT sharing information of a CG-UCI of a PUSCH, that a downlink transmission opportunity begins in a same time slot as a CG-UCI implies that the downlink transmission opportunity 534 begins after the PUSCH—the "UL burst end" may not require a separate bit and may be omitted.

Figure 6:
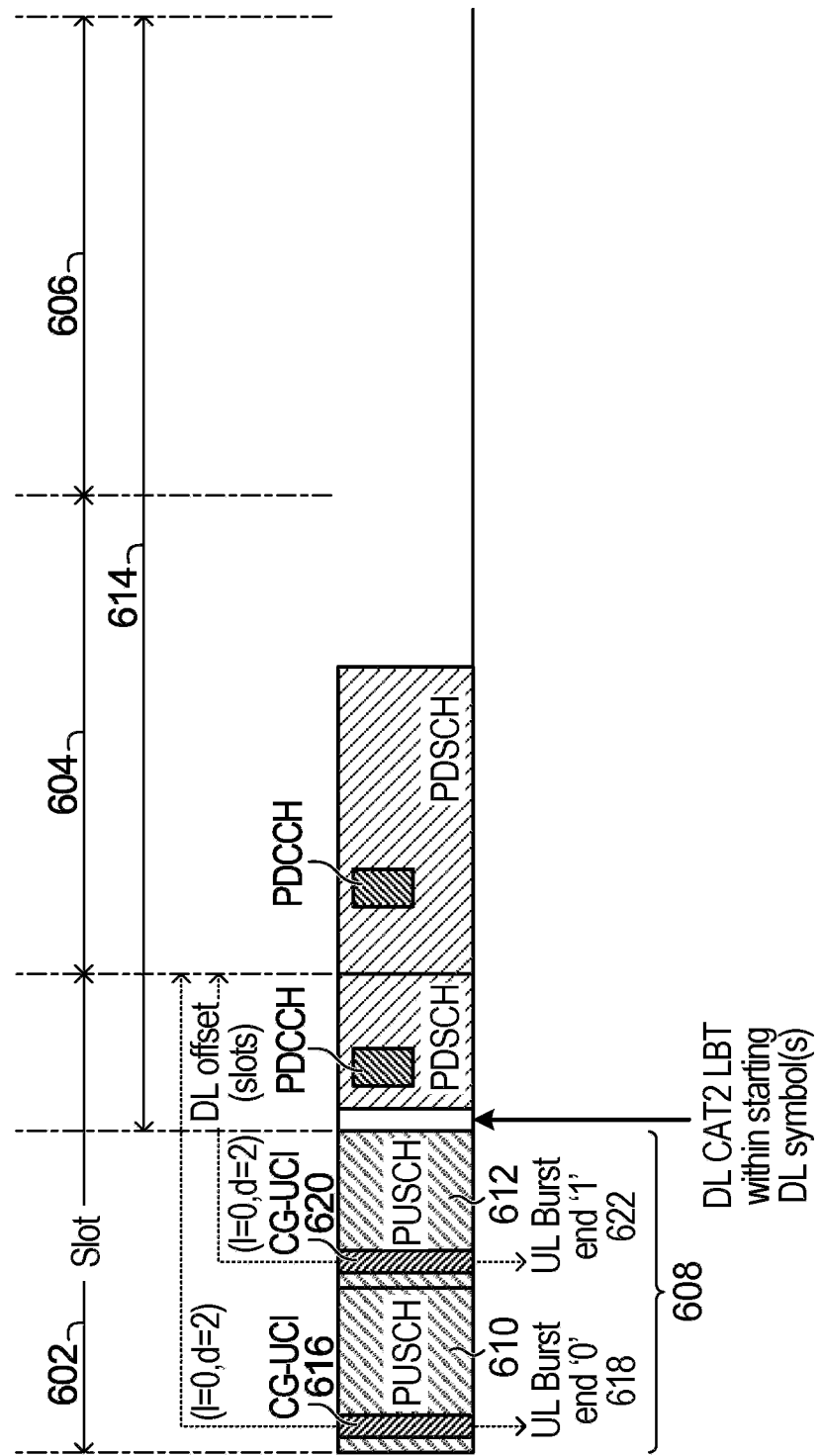

FIG. 6 illustrates an alternative to the embodiment of FIG. 5. In the embodiment of FIG. 6, a time resource for configured grant by the UE 110a in an unlicensed spectrum in the cell 175a of the base station 170a includes time slots 602, 604, and 606 in COT initiated by the UE 110a and within a MCOT of the COT, although alternative embodiments may involve different UEs, different cells, and/or different base stations.

In the example of FIG. 6, during an uplink burst 608 in an uplink transmission from the UE 110a to the base station 170a in a time resource in the unlicensed spectrum in the cell 175a of the base station 170a, the UE 110a transmits an uplink transmission to the base station 170a in a PUSCH 610 in the time slot 602 and in a PUSCH 612 in the time slot 602.

Again, in this example, the uplink burst 608 does not occupy the entire time slot 602, and the uplink burst 608 does not extend into the time slots 604 and 606 that are also within the MCOT. Therefore, the uplink burst 608 includes indications of a downlink transmission opportunity 614 (or, more generally, a transmission opportunity). A partial-slot portion of the downlink transmission opportunity 614 is in a portion of the time slot 602 that is not occupied by the uplink burst 606. Another portion of the downlink transmission opportunity 614 is in the time slots 604 and 606. Therefore, the downlink transmission opportunity 614 begins in the same time slot 602 as the PUSCHs 610 and 612. Further, the portion of the downlink transmission opportunity 614 that begins after the time slot 602 has a duration of two time slots 604 and 606. In other words, the downlink transmission opportunity 614 has a duration of two time slots in addition to the partial-slot portion of the downlink transmission opportunity 614 in the same time slot 602 as the PUSCHs 610 and 612.

In this example, the PUSCH 610 in the time slot 602 includes a CG-UCI 616, and the COT sharing information of the CG-UCI 616 includes an indication that the downlink transmission opportunity 614 begins in the same time slot 602 as the CG-UCI 616, indicated by l=0 in FIG. 6. The COT sharing information of the CG-UCI 616 also includes an indication that the downlink transmission opportunity 614 has a duration of two time slots, indicated by d=2 in FIG. 6, in addition to the partial-slot portion of the downlink transmission opportunity 614 in the same time slot 602 as the PUSCHs 610 and 612.

Therefore, in the embodiment shown, the COT sharing information of the CG-UCI 616 includes a CIV or other identifier identifying the combination (l=0, d=2) in an ordered set of combinations of (l, d). Further, in addition to the identifier of the combination (l=0, d=2) in the ordered set of combinations of (l, d), the CG-UCI 616 also includes a "UL burst end" bit 618 indicating, with a bit value of '0' in this example, that the PUSCH 610 is not the end of the uplink burst 608.

Further, in this example, the PUSCH 612 in the time slot 602 includes a CG-UCI 620, and the COT sharing information of the CG-UCI 620 includes an indication that the downlink transmission opportunity 614 begins in the same time slot 602 as the CG-UCI 620, indicated by the DL offset l=0 in FIG. 6. The COT sharing information of the CG-UCI 616 also includes an indication that the downlink transmission opportunity 614 has a duration of two time slots, indicated by d=2 in FIG. 6, in addition to the partial-slot portion of the downlink transmission opportunity 614 in the same time slot 602 as the PUSCHs 610 and 612. Therefore, in the embodiment shown, the COT sharing information of the CG-UCI 616 includes a CIV or other identifier identifying the combination (l=0, d=2) in an ordered set of combinations of (l, d). Further, in addition to the identifier of the combination (l=0, d=2) in the ordered set of combinations of (l, d), the CG-UCI 616 also includes a "UL burst end" bit 622 indicating, with a bit value of '1' in this example, that the PUSCH 612 is the end of the uplink burst 608. In other words, the "UL burst end" bit 622 is an indication that the beginning of the downlink transmission opportunity 614 is in the same time slot 602 of the COT in the MCOT as the transmission of the CG-UCI 622, the "UL burst end" bit 622 is an indication that the beginning of the downlink transmission opportunity 614 is in a same time slot of the COT as an end of an uplink burst including the transmission of the CG-UCI 622, and the "UL burst end" bit 622 is an indication of a time (in this example, the time being after the PUSCH 612 including the CG-UCI 622) of the beginning of the downlink transmission opportunity 614.

The example of FIG. 6 may then continue with a downlink transmission in the downlink transmission opportunity from the base station 170a to the UE 110a in the downlink transmission opportunity 614 as described above with reference to FIG. 5, for example.

However, unlike the embodiment of FIG. 5, in the embodiment of FIG. 6, the time slot 602 may include, and does include, more than one PUSCH in addition to the partial-slot portion of the downlink transmission opportunity 614 in the same time slot 602 as the PUSCHs 610 and 612. Therefore, unlike the embodiment of FIG. 5, the indication that l=0 in the COT sharing information of the CG-UCI 616 of the PUSCH 610 does not necessarily imply that the uplink burst 608 will end after the PUSCH 610 or that the downlink transmission opportunity 614 begins after the PUSCH 610. As a result, unlike the embodiment of FIG. 5, in the embodiment of FIG. 6—and in some other embodiments in which an indication, in COT sharing information of a CG-UCI of a PUSCH, that a downlink transmission opportunity begins in a same time slot as a CG-UCI does not necessarily imply that the downlink transmission opportunity 534 begins after the PUSCH—the "UL burst end" or an alternative to the "UL burst end" may be required.

Therefore, in the embodiment of FIG. 6, for a particular p and for a particular μ, each of the CG-UCIs 616 and 620 includes COT sharing information in addition to any other data in the CG-UCIs, and the COT sharing information includes either an identifier of a combination in an ordered set of combinations of (l, d) or a "disabling" indication indicating no downlink transmission opportunity, and the COT sharing information of each of the CG-UCIs 616 and 620 also includes a "UL burst end" bit. Therefore, in the embodiments of FIG. 6, for a particular p and for a particular μ, the number of bits required for the COT sharing information of each of the CG-UCIs 616 and 620 is $$B_{p,\mu} = \lceil \log_2(C_{p,\mu} + 1) \rceil + 1 = \left\lceil \log_2\left(\frac{N_{p,\mu}(N_{p,\mu} + 1)}{2} + 1\right) \right\rceil + 1.$$

However, CG-UCIs according to other embodiments may differ. For example, in some embodiments, a UE may blank one or more downlink symbols based on the numerology or SCS of the active BWP after the end of the last PUSCH of an uplink burst to create a switching gap between the uplink burst and a subsequent downlink transmission, and the "UL burst end" of a CG-UCI may be two or more bits to indicate a beginning of a downlink transmission opportunity for the subsequent downlink transmission after the one or more blanked downlink symbols. Still other CG-UCIs according to other embodiments are described below.

Index Values Including Indications of Offsets Within a Time Slot

As indicated above, the "UL burst end" bit 546 or 622 in the COT sharing information of a CG-UCI indicates a time of a beginning of a downlink transmission opportunity within a same time slot as the transmission of the CG-UCI and indicates the time of the beginning of the downlink transmission opportunity in a same time slot of the COT as an end of an uplink burst including the transmission of the CG-UCI. However, as also indicated above, the "UL burst end" bits require at least one additional bit in each of the CG-UCIs 616 and 620.

In some embodiments, the CG-UCI may indicate an index value that may indicate a beginning of a downlink transmission opportunity within a same time slot as the transmission of the CG-UCI, or in a same time slot of the COT as an end of an uplink burst including the transmission of the CG-UCI, without necessarily requiring an additional "UL burst end" bit as in the embodiment of FIG. 6.

Figure 7:
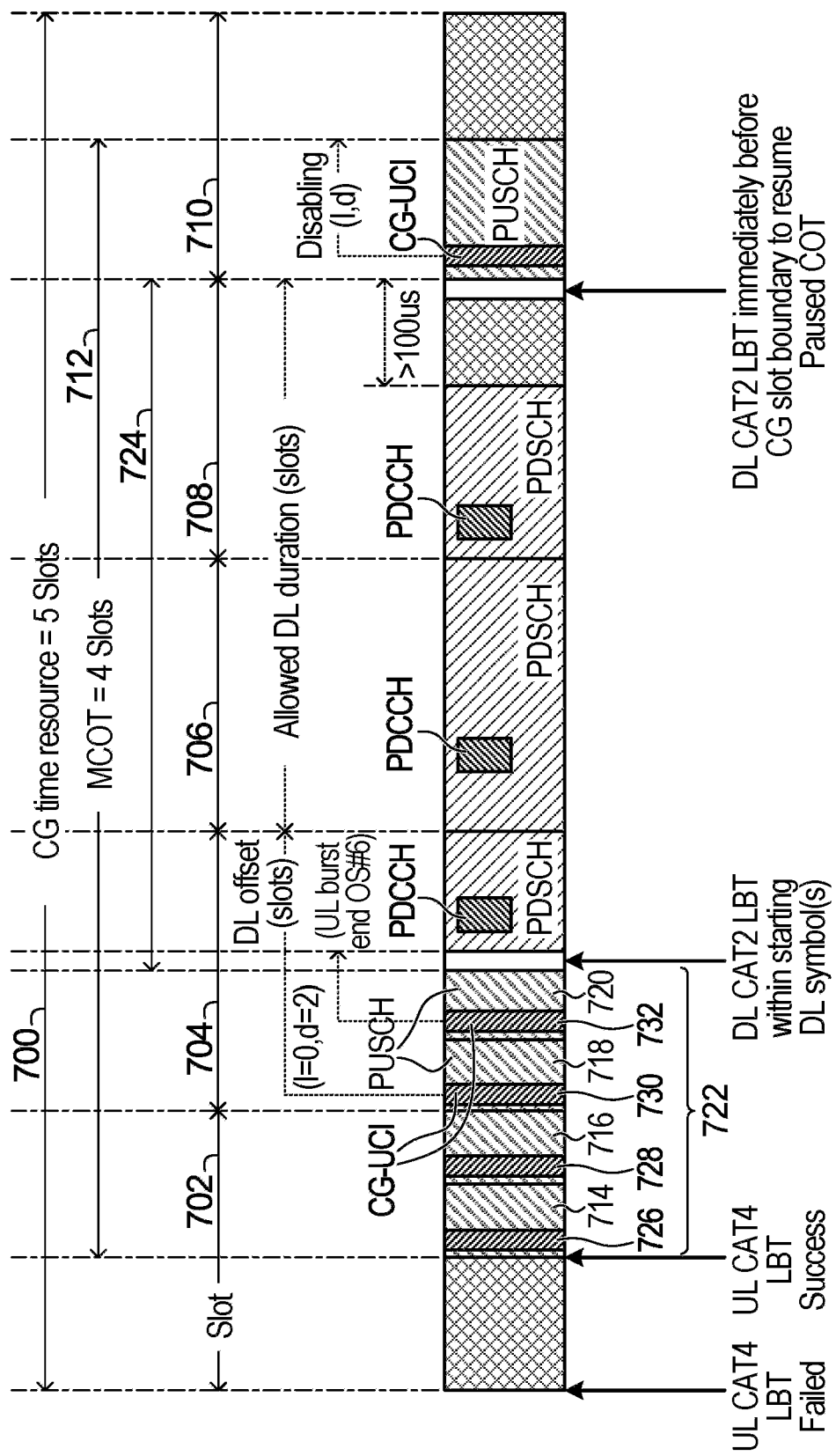

FIG. 7 illustrates an example of a time resource 700 for configured grant by the UE 110a in an unlicensed spectrum in the cell 175a of the base station 170a according to one embodiment, although alternative embodiments may involve different UEs, different cells, and/or different base stations.

In the example of FIG. 7, the time resource 700 includes five time slots 702, 704, 706, 708, and 710, and the UE 110a initiated a COT having a MCOT 712 of four time slots in the time resource 700. During the COT in the MCOT 712, the UE 110a transmits an uplink transmission to the base station 170a in a PUSCH 714 in the time slot 702, in a PUSCH 716 in the time slot 702, in a PUSCH 718 in the time slot 704, and in a PUSCH 720 in the time slot 704. The PUSCHs 714, 716, 718, and 720 therefore form an uplink burst 722 in an uplink transmission from the UE 110a to the base station 170a in the time resource 700 in the unlicensed spectrum in the cell 175a of the base station 170a.

However, in this example, the uplink burst 722 does not occupy the entire time slot 704, and the uplink burst 722 does not extend into the time slots 706 and 708 that are within the MCOT 712. Therefore, the uplink burst 722 includes indications of a downlink transmission opportunity 724 (or, more generally, a transmission opportunity) during the COT in the MCOT 712. A partial-slot portion of the downlink transmission opportunity 724 is in a portion of the time slot 704 that is not occupied by the uplink burst 722. Another portion of the downlink transmission opportunity 724 is in the time slots 706 and 708. Therefore, the downlink transmission opportunity 724 begins in the same time slot 704 as the PUSCHs 718 and 720. Further, the portion of the downlink transmission opportunity 724 that begins after the time slot 704 has a duration of two time slots 706 and 708. In other words, the downlink transmission opportunity 724 has a duration of two time slots in addition to the partial-slot portion of the downlink transmission opportunity 724 in the same time slot 704 as the PUSCHs 718 and 720.

In this example, the PUSCH 714 in the time slot 702 includes a CG-UCI 726, and the PUSCH 716 in the time slot 702 includes a CG-UCI 728. The COT sharing information of the CG-UCIs 726 and 728 each includes an indication that the downlink transmission opportunity 724 begins one time slot after the time slot 702, and indications that the downlink transmission opportunity 702 has a duration of two time slots in addition to the partial-slot portion of the downlink transmission opportunity 724 in the same time slot 704 as the PUSCHs 718 and 720. The COT sharing information of the CG-UCIs 726 and 728 may therefore be similar to the COT sharing information of the CG-UCIs 340 or 342 as shown in FIG. 3.

Further, in this example, the PUSCH 718 in the time slot 704 includes a CG-UCI 730, and the COT sharing information of the CG-UCI 730 includes an indication that the downlink transmission opportunity 724 begins in the same time slot 704 as the CG-UCI 730, indicated by the DL offset l=0 in FIG. 7. The CG-UCI 730 also includes an indication that the downlink transmission opportunity 724 has a duration of two time slots, again indicated by d=2 in FIG. 7, in addition to the partial-slot portion of the downlink transmission opportunity 724 in the same time slot 704 as the PUSCHs 718 and 720. Therefore, in the embodiment shown, the COT sharing information of the CG-UCI 730 includes a CIV or other identifier identifying the combination (l=0, d=2) in an ordered set of combinations of (l, d).

In this example, the slot 704 includes 14 symbols, the PUSCH 718 occupied the first four symbols of the slot 704, and the PUSCH 720 occupied the first three symbols of the slot 704. Therefore, in this example, the PUSCH 720 in the time slot 704 includes a CG-UCI 732, and the COT sharing information of the CG-UCI 732 includes an indication that a beginning of the downlink transmission opportunity 724 is after the first seven symbols in the time slot 704, indicated by "UL burst end OS #6" in FIG. 7, and the COT sharing information of the CG-UCI 732 includes an indication of a ending symbol of the UL burst 722.

Therefore, in some embodiments, the COT sharing information of the CG-UCI 732 includes an indication of an uplink burst end symbol number $N_{ULE}$ indicating a symbol in the time slot 704 before the beginning of the downlink transmission opportunity 724. In this example, the slot 704 includes 14 symbols, and at least one PUSCH occupies at least two symbols of the slot 704. Therefore, in this example, the slot 704 has up to 14−2=12 symbols (from OS #1 to OS #11) when the downlink transmission opportunity 724 could begin in the next OS. In general, the number of symbols in a slot when a uplink burst could end may be referred to as a number of uplink burst endpoints $N_{ULBEP}$.

In an alternative embodiment, rather than indicating an uplink burst end symbol number $N_{ULE}$, sharing information of a CG-UCI may indicate a PUSCH that is the last PUSCH of an uplink burst that ends in a time slot having a partial-slot downlink opportunity. For example, if a time slot includes 14 symbols, and if a PUSCH has a length of at least two symbols, then the time slot may include up to seven PUSCHs. In that example, if an uplink burst ends during the time slot and the time slot includes a partial-slot downlink opportunity, then the time slot may include up to six PUSCHs, and an indicator of a number from the set {0, 1, . . . , 5} may indicate which PUSCH in the time slot is the last PUSCH of the uplink burst. Such an indicator of a last PUSCH of an uplink burst may therefore, in addition to or alternatively to other indicators such as those described herein, indicate a symbol of a beginning of a downlink transmission opportunity.

As indicated above, in some embodiments, an index value identified by COT sharing information of a CG-UCI may identify both a CAPC p that the UE used to initiate the COT and an identifier of a combination in an ordered set of combinations of (l, d). However, in the embodiment of FIG. 7, for example, an index value identified by COT sharing information of a CG-UCI may identify either both a CAPC p that the UE used to initiate the COT and an identifier of a combination in an ordered set of combinations of (l, d) or a time of the beginning of the downlink transmission opportunity in the same time slot of the COT as the transmission of the CG-UCI, as shown in the following example.

| CIV Range Start | CIV Range End | CAPC p | CIV Identifies |
|---|---|---|---|
| 0 | 0 | 0 | "Disabling" indication indicating no downlink transmission opportunity |
| $C_{0,\mu} = 1$ | $C_{1,\mu}$ | 1 | One of $C_{1,\mu}$ combinations of (l, d) |
| $A_{1,\mu} = C_{1,\mu} + 1$ | $C_{1,\mu} + C_{2,\mu}$ | 2 | One of $C_{2,\mu}$ combinations of (l, d) |

-continued

| CIV Range Start | CIV Range End | CAPC p | CIV Identifies |
|---|---|---|---|
| $\Delta_{2,\mu} = \Delta_{1,\mu} + C_{2,\mu}$ | $C_{1,\mu} + C_{2,\mu} + C_{3,\mu}$ | 3 | One of $C_{3,\mu}$ combinations of (l, d) |
| $\Delta_{3,\mu} = \Delta_{2,\mu} + C_{3,\mu}$ | $C_{1,\mu} + C_{2,\mu} + C_{3,\mu} + C_{4,\mu}$ | 4 | One of $C_{4,\mu}$ combinations of (l, d) |
| $\Delta_{4,\mu} = \Delta_{3,\mu} + C_{4,\mu}$ | $\Delta_{4,\mu} + N_{ULBEP} - 1$ | None | An uplink end symbol number $N_{ULE}$ of $N_{ULBEP}$ uplink burst endpoints |
| $\Delta_{4,\mu} + N_{ULBEP}$ | $2^{B_\mu} - 1$ | None | Reserved (if any) |

In this example, an index value from $\Delta_{4,\mu}$ to $\Delta_{4,\mu} + N_{ULBEP}$ indicates an uplink symbol number $N_{ULE}$ of the $N_{ULBEP}$ uplink burst endpoints, so $\Delta_{4,\mu} + N_{ULBEP}$ CIV values are required, the number of bits required to indicate the number of required CIV values is $2^{B_\mu} = \lceil \log_2(\Delta_{4,\mu} + N_{ULBEP}) \rceil$, and any index values from $\Delta_{4,\mu} + N_{ULBEP} + 1$ to $2^{B_\mu} - 1$ are unused, or reserved.

An example of index values is shown below in an embodiment in which $\mu=1$ (30 kHz), $N_{1,1}=4$, $N_{2,1}=8$, $N_{3,1}=12$, $N_{4,1}=12$, $N_{ULBEP}=11$, $B_1=8$ bits in addition to any bits that may be required for other data in the CG-UCIs, and $2^{B_1}=256$.

| CIV Range Start | CIV Range End | CAPC p | CIV Identifies |
|---|---|---|---|
| 0 | 0 | 0 | "Disabling" indication indicating no downlink transmission opportunity |
| $C_{0,1} = 1$ | $C_{1,1} = 10$ | 1 | One of $C_{1,\mu} = \frac{N_{1,1}(N_{1,1}+1)}{2} = \frac{4 \times 5}{2} = 10$ combinations of (l, d) |
| $\Delta_{1,1} = C_{1,1} + 1 = 11$ | $C_{1,1} + C_{2,1} = 46$ | 2 | One of $C_{2,\mu} = \frac{N_{2,1}(N_{2,1}+1)}{2} = \frac{8 \times 9}{2} = 36$ combinations of (l, d) |
| $\Delta_{2,1} = \Delta_{1,1} + C_{2,1} = 47$ | $C_{1,1} + C_{2,1} + C_{3,1} = 124$ | 3 | One of $C_{3,\mu} = \frac{N_{3,1}(N_{3,1}+1)}{2} = \frac{12 \times 13}{2} = 78$ combinations of (l, d) |
| $\Delta_{3,1} = \Delta_{2,1} + C_{3,1} = 125$ | $C_{1,1} + C_{2,1} + C_{3,1} + C_{4,1} = 202$ | 4 | One of $C_{4,\mu} = \frac{N_{4,1}(N_{4,1}+1)}{2} = \frac{12 \times 13}{2} = 78$ combinations of (l, d) |
| $\Delta_{4,1} = \Delta_{3,1} + C_{4,1} = 203$ | $\Delta_{4,1} + N_{ULBEP} - 1 = 213$ | None | An uplink end symbol number $N_{ULE}$ of $N_{ULBEP} = 11$ uplink burst endpoints |
| $\Delta_{4,1} + N_{ULBEP} = 214$ | $2^{B_1} - 1 = 255$ | None | Reserved |

In this example, in which $p \in \{1, 2, 3, 4\}$, a CIV identifying a combination (l, d) may be identified by $$CIV(l, d) = \begin{cases} N_{p,\mu}d + l + \Delta_{p-1,\mu} & \text{if } d \leq \lfloor \frac{N_{p,\mu}}{2} \rfloor \\ N_{p,\mu}(N_{p,\mu}-d) + (N_{p,\mu}-l-1) + \Delta_{p-1,\mu} & \text{otherwise} \end{cases}$$

Again, in this example in which $p \in \{1, 2, 3, 4\}$, a CIV identifying an uplink end symbol number $N_{ULE} \in \{1, 2, \ldots, N_{ULBEP}\}$ may be identified by $$CIV(N_{ULE}) = N_{ULE} + \Delta_{4,\mu} - 1.$$

In this example in which $p \in \{1, 2, 3, 4\}$, a CIV may be decoded as follows.

If CIV=0, then CIV indicates a "disabling" indication indicating no downlink transmission opportunity.

If $CIV \geq \Delta_{4,\mu}$, then CIV indicates $N_{ULE} = CIV - \Delta_{4,\mu} + 1$.

If $0 \leq CIV < \Delta_{4,\mu}$, then for p that satisfies $\Delta_{p-1,\mu} \leq CIV < \Delta_{p,\mu}$, CIV indicates $$d = \begin{cases} \lfloor \frac{CIV}{N_{p,\mu}} \rfloor & \text{if } \lfloor \frac{CIV}{N_{p,\mu}} \rfloor \leq \lfloor \frac{N_{p,\mu}}{2} \rfloor \\ N_{p,\mu} - \lfloor \frac{CIV}{N_{p,\mu}} \rfloor & \text{otherwise} \end{cases} \text{ and}$$

$$l = \begin{cases} CIV - N_{p,\mu}d & \text{if } \lfloor \frac{CIV}{N_{p,\mu}} \rfloor \leq \lfloor \frac{N_{p,\mu}}{2} \rfloor \\ N_{p,\mu} - CIV - 1 + N_{p,\mu}(N_{p,\mu} - d) & \text{otherwise} \end{cases}.$$

In this example, the CIV indicating respective combinations (l, d) for p=1 are as follows.

In this example, the CIV indicating respective combinations (l, d) for p=2 are as follows.

| $C_{0,\mu}+$ | 0 | 1 | 2 | 3 |
|---|---|---|---|---|
| | | | | d |
| 0 | 0 | 4 | 8 | 7 |
| 1 | 1 | 5 | 9 | |
| 2 | 2 | 6 | | |
| 3 | 3 | | | |

In this example, the CIV indicating respective combinations (l, d) for p=2 are as follows.

| $\Delta_{1,\mu}+$ | 0 | 1 | 2 | 3 | 4 | 5 | 6 | 7 |
|---|---|---|---|---|---|---|---|---|
| | | | | | d | | | |
| 0 | 0 | 8 | 16 | 24 | 32 | 31 | 23 | 15 |
| 1 | 1 | 9 | 17 | 25 | 33 | 30 | 22 | |
| 2 | 2 | 10 | 18 | 26 | 34 | 29 | | |
| 3 | 3 | 11 | 19 | 27 | 35 | | | |
| 4 | 4 | 12 | 20 | 28 | | | | |
| 5 | 5 | 13 | 21 | | | | | |
| 6 | 6 | 14 | | | | | | |
| 7 | 7 | | | | | | | |

In this example, the CIV indicating respective combinations (l, d) for p=3 are as follows.

| $\Delta_{2,\mu}+$ | 0 | 1 | 2 | 3 | 4 | 5 | 6 | 7 | 8 | 9 | 10 | 11 |
|---|---|---|---|---|---|---|---|---|---|---|---|---|
| | | | | | | d | | | | | | |
| 0 | 0 | 12 | 24 | 36 | 48 | 60 | 72 | 71 | 59 | 47 | 35 | 23 |
| 1 | 1 | 13 | 25 | 37 | 49 | 61 | 73 | 70 | 58 | 46 | 34 | |
| 2 | 2 | 14 | 26 | 38 | 50 | 62 | 74 | 69 | 57 | 45 | | |
| 3 | 3 | 15 | 27 | 39 | 51 | 63 | 75 | 68 | 56 | | | |
| 4 | 4 | 16 | 28 | 40 | 52 | 64 | 76 | 67 | | | | |
| 5 | 5 | 17 | 29 | 41 | 53 | 65 | 77 | | | | | |
| 6 | 6 | 18 | 30 | 42 | 54 | 66 | | | | | | |
| 7 | 7 | 19 | 31 | 43 | 55 | | | | | | | |
| 8 | 8 | 20 | 32 | 44 | | | | | | | | |
| 9 | 9 | 21 | 33 | | | | | | | | | |
| 10 | 10 | 22 | | | | | | | | | | |
| 11 | 11 | | | | | | | | | | | |

In this example, the CIV indicating respective combinations (l, d) for p=4 are as follows.

| $\Delta_{3,\mu}+$ | 0 | 1 | 2 | 3 | 4 | 5 | 6 | 7 | 8 | 9 | 10 | 11 |
|---|---|---|---|---|---|---|---|---|---|---|---|---|
| | | | | | | d | | | | | | |
| 0 | 0 | 12 | 24 | 36 | 48 | 60 | 72 | 71 | 59 | 47 | 35 | 23 |
| 1 | 1 | 13 | 25 | 37 | 49 | 61 | 73 | 70 | 58 | 46 | 34 | |
| 2 | 2 | 14 | 26 | 38 | 50 | 62 | 74 | 69 | 57 | 45 | | |
| 3 | 3 | 15 | 27 | 39 | 51 | 63 | 75 | 68 | 56 | | | |
| 4 | 4 | 16 | 28 | 40 | 52 | 64 | 76 | 67 | | | | |
| 5 | 5 | 17 | 29 | 41 | 53 | 65 | 77 | | | | | |
| 6 | 6 | 18 | 30 | 42 | 54 | 66 | | | | | | |
| 7 | 7 | 19 | 31 | 43 | 55 | | | | | | | |
| 8 | 8 | 20 | 32 | 44 | | | | | | | | |
| 9 | 9 | 21 | 33 | | | | | | | | | |
| 10 | 10 | 22 | | | | | | | | | | |
| 11 | 11 | | | | | | | | | | | |

In the example of FIG. 7, the COT sharing information of the CG-UCI 730 includes an indication that the downlink transmission opportunity 724 has a duration of two time slots in addition to the partial-slot portion of the downlink transmission opportunity 724 in the same time slot 704 as the PUSCHs 718 and 720, indicated by d=2 in FIG. 7, and the COT sharing information of the CG-UCI 732 includes an indication that a beginning of the downlink transmission opportunity 724 is after the first seven symbols in the time slot 704, indicated by "UL burst end OS #6" in FIG. 7. In the example of FIG. 7, a duration of the downlink transmission opportunity 724 is a number of downlink symbols $$N_{SDL} = (N_{SS} - N_{ULE} - 1) + d \cdot N_{SS}$$

where $N_{SS}$ is a number of symbols in each time slot. Therefore, in the example of FIG. 7, the CG-UCIs 730 and 732 collectively include indications of a duration of the downlink transmission opportunity 724 and of the beginning of the downlink transmission opportunity 724.

Again, alternative embodiments may differ. For example, in alternative embodiments, one or more index values or other indicators may indicate a CAPC p that the UE used to initiate the COT, a "disabling" indication indicating no downlink transmission opportunity, a time delay (or offset) to a beginning of a downlink transmission opportunity, a duration of the downlink transmission opportunity, a time of the beginning of the downlink transmission opportunity in the same time slot as the transmission of the CG-UCI, or a combination of two or more thereof. In some other embodiments, the order of transmitting the COT sharing information of the CG-UCIs 730 and 732 may be reversed without impacting the collective COT sharing information indicated to the base station 170a.

After the PUSCH 720 as described above, the example of FIG. 7 may then continue with a downlink transmission in the downlink transmission opportunity from the base station 170a to the UE 110a in the downlink transmission opportunity 614 as described above with reference to FIG. 5, for example.

Figure 8:
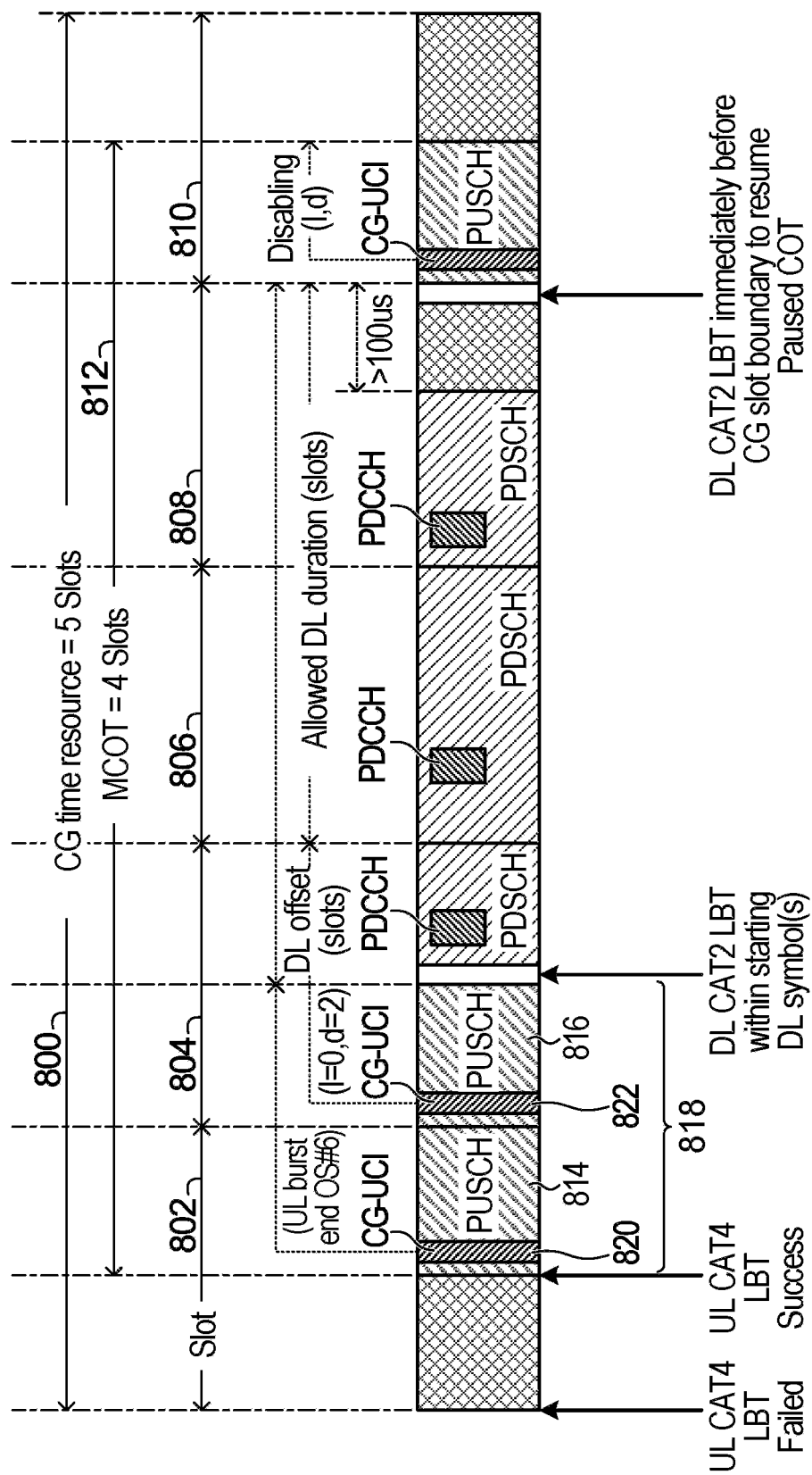

FIG. 8 illustrates an example of a time resource 800 for configured grant by the UE 110a in an unlicensed spectrum in the cell 175a of the base station 170a according to one embodiment, although alternative embodiments may involve different UEs, different cells, and/or different base stations.

In the example of FIG. 8, the time resource 800 includes five time slots 802, 804, 806, 808, and 810, and the UE 110a initiated a COT having a MCOT 812 of four time slots in the time resource 800. During the COT in the MCOT 812, the UE 110a transmits an uplink transmission to the base station 170a in a PUSCH 814 in the time slot 802 and in a PUSCH 816 in the time slot 804. The PUSCHs 814 and 816 therefore form an uplink burst 818 in an uplink transmission from the UE 110a to the base station 170a in the time resource 800 in the unlicensed spectrum in the cell 175a of the base station 170a.

In this example, the PUSCH 814 in the time slot 802 includes a CG-UCI 820, and the PUSCH 816 in the time slot 804 includes a CG-UCI 822. Similar to the COT sharing information of the CG-UCI 732, the COT sharing information of the CG-UCI 820 includes an indication that a beginning of a downlink transmission opportunity 824 (or, more generally, a transmission opportunity) is after the first seven symbols, indicated by "UL burst end OS #6" in FIG. 8. The CG-UCI 820 is in the time slot 802, and the first six symbols of the time slot 802 have already passed, so the CG-UCI 820 indicates instead that the beginning of the downlink transmission opportunity 824 is after the first seven symbols of the next time slot, namely the time slot 804, or more generally, after the first seven symbols of a subsequent slot in the UL burst. The COT sharing information of the CG-UCI 822 includes an indication of the DL offset (l=0) and thus confirms that the beginning of the downlink transmission opportunity 824 is after the first seven symbols of the same time slot, namely the time slot 804. The COT sharing information of the CG-UCI 822 further includes an indication of the duration (indicated by d=2 in FIG. 8) of the downlink transmission opportunity 824.

In summary, in the example of FIG. 8, the CG-UCI 820, which includes the indication of the beginning of the downlink transmission opportunity 824, may be in the PUSCH 814 before the PUSCH 816, which is the last PUSCH of the an uplink burst 818 and the last PUSCH before the beginning of the downlink transmission opportunity 824. Therefore, the indication of the beginning of the downlink transmission opportunity 824 in the COT sharing information of the CG-UCI 820 is an indication that the beginning of the downlink transmission opportunity 824 is in a same time slot of the COT as an end of an uplink burst including the transmission of the CG-UCI 820, and the indication of the beginning of the downlink transmission opportunity 824 in the COT sharing information of the CG-UCI 820 is an indication of a time (in this example, the time being after the first seven symbols of the next time slot, namely the time slot 804) of the beginning of the downlink transmission opportunity 824.

COT Sharing Information Payload Size

In some embodiments, a base station may configure a UE to use a bit field having a configured payload size of $B_{p,\mu}$ bits for COT sharing information in CG-UCIs in addition to any bits that may be required for other data in the CG-UCIs.

As indicated above, in the embodiments of FIGS. 3 and 4 and some other embodiments, different configured-grant resources may be used for particular respective CAPCs, and $B_{p,\mu}$ may be determined without any bits to indicate the CAPC p that the UE used to initiate the COT.

However, as also indicated above, COT sharing information of a CG-UCI may include two bits, or a different number of bits, to indicate a CAPC p that the UE used to initiate the COT, and $B_{p,\mu}$ may be determined to include any bits that indicate the CAPC p that the UE used to initiate the COT.

In other embodiments, an index value may indicate a CAPC p that the UE used to initiate the COT, in which case $B_{p,\mu}$ may be determined without any bits to indicate the CAPC p that the UE used to initiate the COT.

In general, in some embodiments, $B_{p,\mu}$ may be determined to accommodate the largest possible p, such as $B_{4,\mu}$ for example, irrespective of the actual CAPC p that the UE used to initiate the COT, to avoid a variable size of the CG-UCI.

As indicated above, a MCOT of COT initiated by a UE has $N_{p,\mu}$ time slots. In some embodiments, a configured payload size $B_{p,\mu}$ may be determined as the number of bits required for all CIV values that may be required. The number of CIV values that may be required may be determined according to one of the examples above, or in other ways. In some embodiments, when determining the number of CIV values that may be required, $N_{p,\mu}$ may be based on the numerology or SCS μ of an active BWP, or may be based on a reference numerology or SCS $\mu_{ref}=0$ (15 kHz, for example) irrespective of the numerology or SCS of the active BWP.

When $N_{p,\mu}$ is based on a reference numerology or SCS $\mu_{ref}$, and when $\mu>\mu_{ref}$ indications of time delay l and indications of duration d represent more than one time slot and therefore have coarser granularity than when $N_{p,\mu}$ is based on a numerology or SCS μ of an active BWP.

Therefore, when $N_{p,\mu}$ is based on a reference numerology or SCS $\mu_{ref}$, when $\mu>\mu_{ref}$, and when a CIV value indicates a duration d of a downlink transmission opportunity, the actual duration of the downlink transmission opportunity in the numerology or SCS μ of an active BWP may be longer than the duration indicated by d, and the base station may transmit a downlink transmission having a duration of $d \times 2^{\mu-\mu_{ref}}$ time slots, in addition to a partial-slot DL transmission if indicated.

However, when $N_{p,\mu}$ is based on a reference numerology or SCS $\mu_{ref}$, and when $\mu>\mu_{ref}$, the COT sharing information may require an additional slot offset adjustment value j to indicate a slot time delay in a number of slots. For example, when $\mu-\mu_{ref}=1$, one bit in the COT sharing information may represent j such that $j \in \{0, 1\}$, and l and j may collectively indicate a time delay (or offset) of $l \times 2^{\mu-\mu_{ref}}+j=2l+j$ time slots. As another example, when $\mu-\mu_{ref}=2$, two bits in the COT sharing information may represent j such that $j \in \{0, 1, 2, 3\}$, and l and j may collectively indicate a time delay (or offset) of $l \times 2^{\mu-\mu_{ref}}+j=4l+j$ time slots. Therefore, in some embodiments, $\mu-\mu_{ref}$ bits in the COT sharing information may represent j. Furthermore, in another example, when $\mu \leq \mu_{ref}$, no bits in the COT sharing information may be configured for the CG-UCI transmitted in the BWP configured with the numerology or SCS μ.

Partial-Slot Downlink Opportunities

As indicated above, in some embodiments, d=0 or another indicator may indicate a partial-slot downlink opportunity. For example, FIG. 9 illustrates a time resource 900 according to one embodiment for configured grant by the UE 110a in an unlicensed spectrum in the cell 175a of the base station 170a according to one embodiment, although alternative embodiments may involve different UEs, different cells, and/or different base stations.

Figure 9:
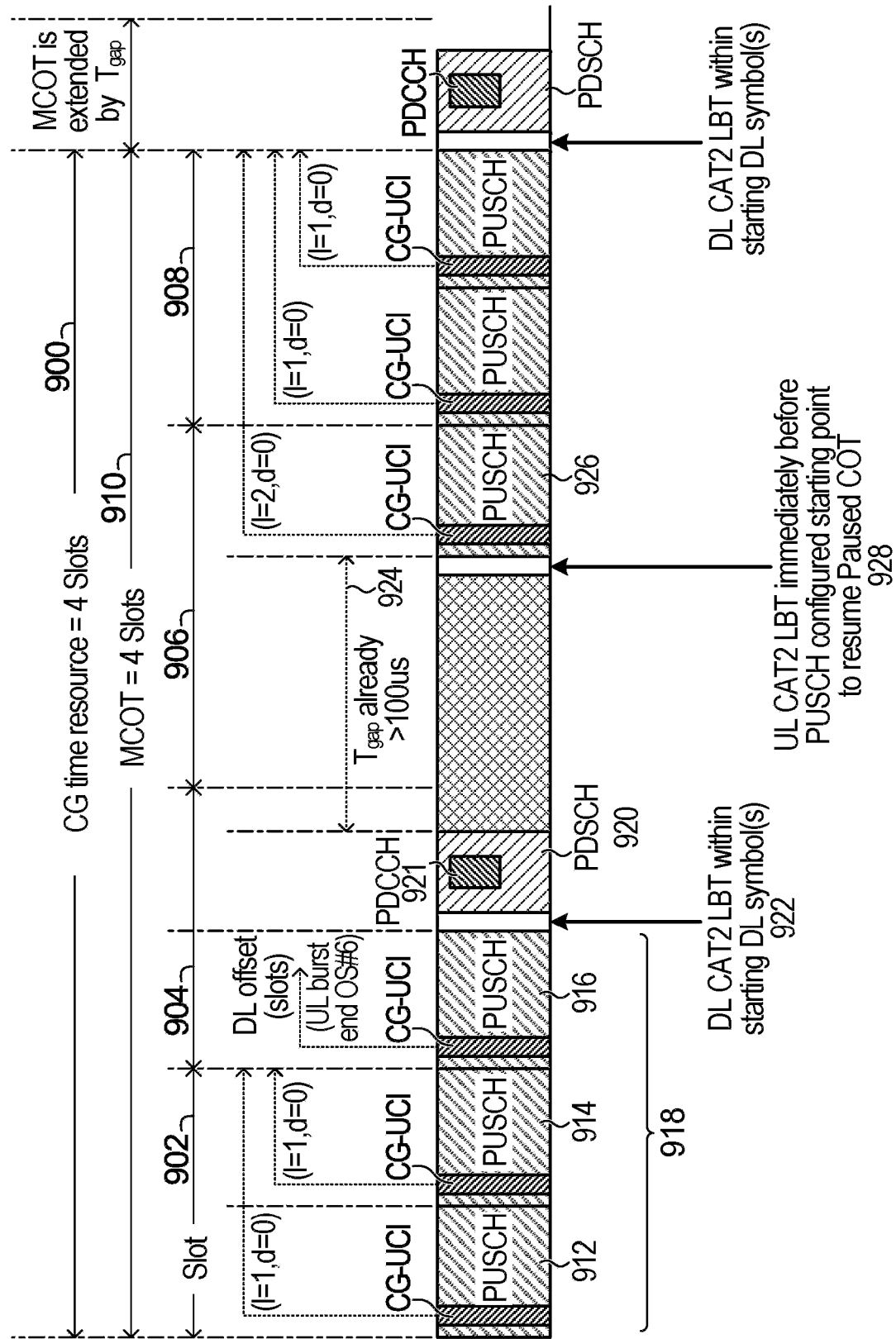

In the example of FIG. 9, the time resource 900 includes four time slots 902, 904, 906, and 908, and the UE 110a initiated a COT having a MCOT 910 of the same four time slots 902, 904, 906, and 908 in the time resource 900. During the COT in the MCOT 910, the UE 110a transmits an uplink transmission to the base station 170a in a PUSCH 912 in the time slot 902, in a PUSCH 914 in the time slot 902, and in a PUSCH 916 in the time slot 904. The PUSCHs 912, 914, and 916 therefore form an uplink burst 918 in an uplink transmission from the UE 110a to the base station 170a in the time resource 900 in the unlicensed spectrum in the cell 175a of the base station 170a.

In the embodiment shown, after the uplink burst 918 from the UE 110a to the base station 170a, the base station 170a initiates a downlink transmission including a PDSCH 920 in the time slot 904 by a downlink DL LBT procedure 922. To accommodate the DL LBT procedure 922, the base station 170a may blank one or more downlink symbols based on the numerology or SCS of the active BWP and a CP extension not exceeding one symbol duration to provide a switching gap between the uplink transmission and the downlink transmission. The switching gap between the uplink burst 918 and the PDSCH 920 may be 16 μs or 25 μs if the DL LBT procedure 922 is a CAT2 DL LBT procedure. Alternatively, the switching gap between the uplink burst 918 and the PDSCH 920 may be 16 μs if the DL LBT procedure 922 is a category 1 (CAT1) LBT, i.e., direct transmission without LBT performed in the switching gap.

In this example, the UE 110a resumes uplink transmission in the COT of the MCOT 910 after a gap 924 of at least 100 μs from the PDSCH 920 to the first PUSCH 926 of the resumed uplink transmission. The resumed uplink transmission may be resumed by a CAT2 UL LBT procedure 928 in a switching gap, which may be 25 µs, for example. However, in other embodiments, the UE 110a may resume uplink transmission according to one or more uplink grants that may have been received in the PDCCH 921 included in the downlink transmission including the PDSCH 920. Such uplink grants may indicate an LBT type and a switching gap duration for resuming the uplink transmission.

Multiple Active Configurations

Figure 10:
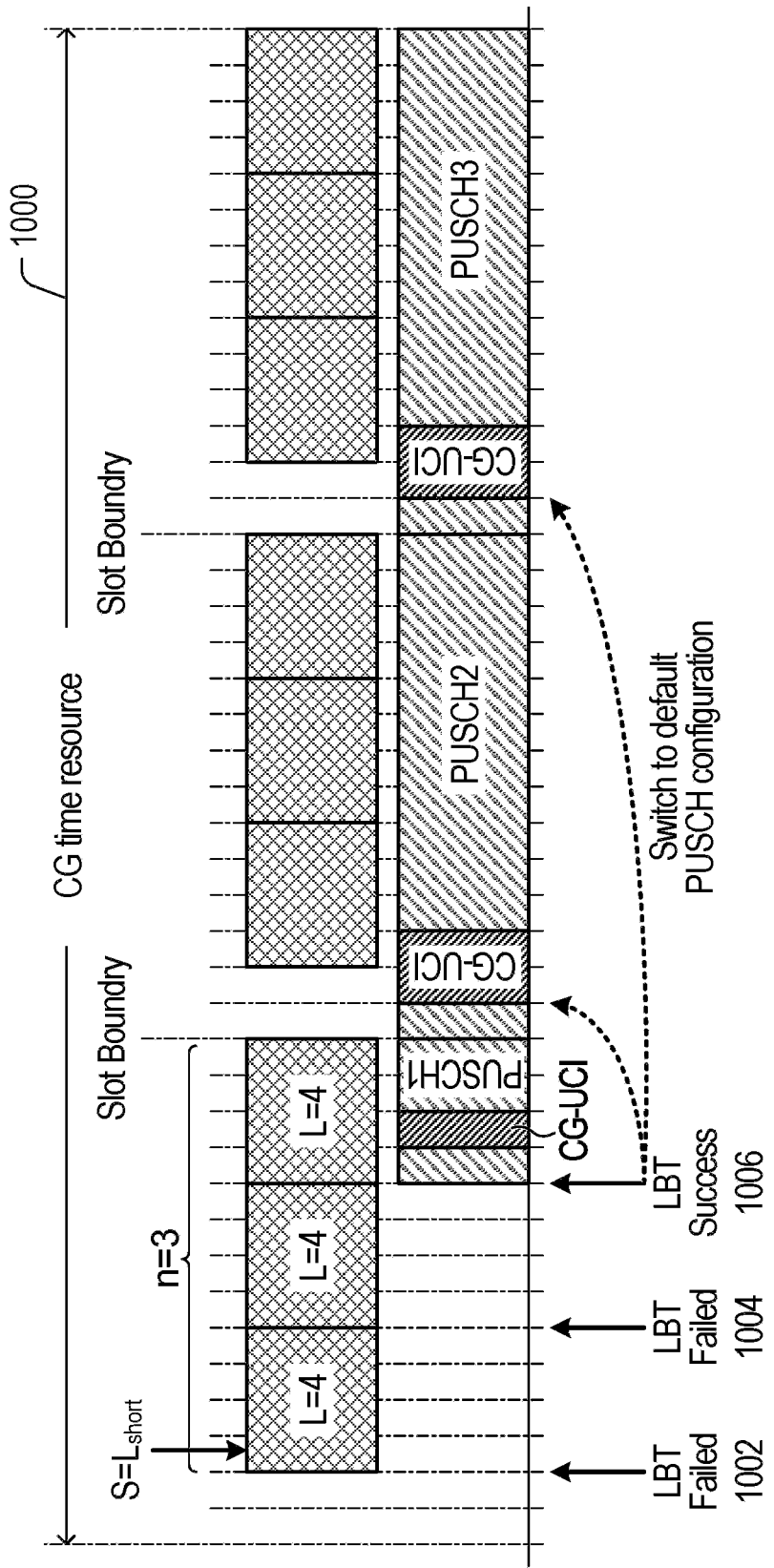

FIG. 10 illustrates an example of a time resource 1000 for configured grant by the UE 110a in an unlicensed spectrum in the cell 175a of the base station 170a according to one embodiment, although alternative embodiments may involve different UEs, different cells, and/or different base stations.

In the example of FIG. 10, the UE 110a attempted to initiate COT for an uplink transmission to the base station 170a in the time resource 1000 by a first UL LBT procedure 1002 and later by a second UL LBT procedure 1004. The UL LBT procedures 1002 and 1004 failed. After the UL LBT procedures 1002 and 1004, the UE 110a attempted to initiate COT for an uplink transmission to the base station 170a in the time resource 1000 by a third UL LBT procedure 1006, and the third UL LBT procedure 1006 succeeded. Therefore, following UL LBT procedure 1006, the UE 110a initiated COT in the time resource 1000.

In this example, at the time of the UL LBT procedures 1002, 1004, and 1006, the time resource 1000 had three (indicated by n=3 in FIG. 10) short four-symbol (indicated by L=4 in FIG. 10) mini-slot CG PUSCHs per time slot, and one mini-slot CG PUSCH per four-symbol mini-slot. However, after the UE 110a initiated the COT in the time resource 1000, the UE 110a switched to another configured-grant configuration, which may be a default configuration, including two seven-symbol slots per time slot, and one 14-symbol PUSCH per slot. The embodiment of FIG. 10 is an example only, and in alternative embodiments, a UE may switch between two or more different configured-grant configurations that may differ from the two configured-grant configurations that are shown in FIG. 10.

In some embodiments, a UE may be configured with a hybrid configuration including parameters for different configured-grant configurations. For example, in some embodiments, to avoid control overhead, a UE may be configured with a CG-UCI payload size accounting for COT sharing information for only CG-PUSCHs of a default configuration. In other embodiments, a UE may be configured with a first CG-UCI payload size accounting for a first COT sharing information for a default configuration, and may be configured with a second smaller CG-UCI payload size accounting for a second COT sharing information for CG-PUSCHs of an initial configuration by reducing $N_{p,\mu}$ or eliminating some combinations of (l, d) to reflect shorter mini-slots per time slot.

In some other embodiments, if the CG time-domain resource configuration indicates that CG-PUSCHs of different length can be transmitted in accordance with the same configuration, e.g., in the same slot as in FIG. 7 (PUSCH 718 and 720), or across different slots as in the hybrid configuration discussed above, the CG-UCI payload size including the COT sharing information size, along with the resource mapping beta offset value, may be determined based on the CG PUSCH of the smallest size, whereas rate matching may be used by the UE to map the CG-UCI payload bits to the larger resources on the larger CG PUSCHs as determined by the beta offset value.

Sidelink Transmissions

The foregoing examples illustrate sharing of COT for downlink transmissions. However, in other embodiments, COT may be shared in sidelink transmissions between two UEs, such as the UEs 110a and 110b, for example. Sharing of COT in sidelink transmissions may be similar to sharing of COT for downlink transmissions as described above, except that sharing of COT in sidelink transmissions would involve sharing COT in sidelink configured grant, rather than sharing COT in configured grant from a base station. The sidelink configured grant resources may be determined by the base station or may be selected from a configured resource pool by the COT transmitting UE initiating the COT.

DL Transmit Power Level and Energy Detection Threshold

In embodiments such as those described herein, the base station may be using a higher transmit power level than that of the UE that initiated the UL COT. In order to improve the coexistence fairness with other nodes/radio access technologies operating in the same unlicensed spectrum, the base station may apply one or more of the following techniques:

The base station may reduce its CCA energy detection threshold. The CCA is part of the DL LBT procedure the base station uses to access the DL transmission opportunity indicated via the COT sharing information in the CG-UCI.

The base station may reduce its transmission power level to match the transmit power level of the UE that initiated the UL COT. The base station may predict the transmit power of the UE using the UL measurements such as SRS measurements and/or by tracking the transmit power control (TPC) commands it sent to the UE.

OTHER EXAMPLES

This disclosure includes the following other examples as further illustrations of embodiments of the disclosure, which are not intended to limit the scope of the disclosure.

1. A method performed by a user equipment (UE) for configured-grant transmission, the method comprising:
    transmitting, by the UE, a configured-grant uplink control information (CG-UCI) to a base station during a channel occupancy time (COT) in an unlicensed spectrum, the CG-UCI comprising an indication of a time delay to a beginning of a downlink transmission opportunity during the COT; and
    receiving, by the UE, a downlink transmission within the downlink transmission opportunity.

2. The method of example 1 wherein the CG-UCI further comprises an indication of a duration of the downlink transmission opportunity.

3. The method of example 2 wherein the indication of the duration indicates, at least, a number of time slots of the downlink transmission opportunity.

4. The method of example 2 or 3 wherein the CG-UCI comprises a value of an index, the value of the index comprising the indication of the time delay and the indication of the duration.

5. The method of example 4, wherein the value of the index indicates, at least, a combination in an ordered set of combinations of:
    time delays to the beginning of the downlink transmission opportunity; and
    durations of the downlink transmission opportunity.

6. The method of any one of examples 1 to 5 wherein the indication of the time delay indicates, at least, a number of time slots of the COT from transmission of the CG-UCI to the beginning of the downlink transmission opportunity.

7. The method of any one of examples 1 to 5 wherein the indication of the time delay indicates, at least, that the beginning of the downlink transmission opportunity is in a same time slot of the COT as an end of an uplink burst comprising the transmission of the CG-UCI.

8. The method of example 7 wherein the indication of the time delay indicates, at least, that the beginning of the downlink transmission opportunity is in a same time slot of the COT as the transmission of the CG-UCI.

9. The method of example 7 or 8 wherein the indication of the time delay comprises a value of at least one bit in the CG-UCI indicating an end of the uplink burst comprising the transmission of the CG-UCI.

10. The method of example 1 wherein:
    the indication of the time delay comprises a value of an index, the value of the index comprising the indication of the time delay; and
    some other values of the index identify respective combinations in an ordered set of combinations of:
    time delays to the beginning of the downlink transmission opportunity; and
    durations of the downlink transmission opportunity.

11. The method of any one of examples 1 to 10 wherein the indication of the time delay indicates, at least, a symbol of the beginning of the downlink transmission opportunity.

12. The method of any one of examples 1 to 11 wherein receiving the downlink transmission comprises receiving the downlink transmission from the base station.

13. The method of any one of examples 1 to 12 wherein receiving the downlink transmission comprises receiving the downlink transmission in at least one physical downlink shared channel (PDSCH).

14. The method of any one of examples 1 to 13 wherein transmitting the CG-UCI to the base station comprises transmitting a physical uplink shared channel (PUSCH) comprising the CG-UCI.

15. The method of any one of examples 1 to 14 wherein the COT was initiated by the UE.

16. The method of example 15 wherein the COT was initiated by the UE in a channel access priority class (CAPC), and wherein the CG-UCI further comprises an indication of the CAPC.

17. A user equipment (UE) apparatus comprising:
    at least one processor; and
    at least one processor-readable storage device comprising stored thereon processor-executable instructions that, when executed by the at least one processor, cause the at least one processor to, at least:
    execute a method according to any one of examples 1 to 16.

18. A method performed by a base station for configured-grant transmission, the method comprising:
    receiving, by the base station, a configured-grant uplink control information (CG-UCI) from a user equipment (UE) during a channel occupancy time (COT) in an unlicensed spectrum, the CG-UCI comprising an indication of a time delay to a beginning of a downlink transmission opportunity during the COT; and
    transmitting, by the base station, a downlink transmission to the UE within the downlink transmission opportunity.

19. The method of example 18 wherein the CG-UCI further comprises an indication of a duration of the downlink transmission opportunity.

20. The method of example 19 wherein the indication of the duration indicates, at least, a number of time slots of the downlink transmission opportunity.

21. The method of example 19 or 20 wherein the CG-UCI comprises a value of an index, the value of the index comprising the indication of the time delay and the indication of the duration.

22. The method of example 21, wherein the value of the index indicates, at least, a combination in an ordered set of combinations of:
    time delays to the beginning of the downlink transmission opportunity; and durations of the downlink transmission opportunity.

23. The method of any one of examples 18 to 22 wherein the indication of the time delay indicates, at least, a number of time slots of the COT from transmission of the CG-UCI to the beginning of the downlink transmission opportunity.

24. The method of any one of examples 18 to 22 wherein the indication of the time delay indicates, at least, that the beginning of the downlink transmission opportunity is in a same time slot of the COT as an end of an uplink burst comprising the transmission of the CG-UCI.

25. The method of example 24 wherein the indication of the time delay indicates, at least, that the beginning of the downlink transmission opportunity is in a same time slot of the COT as the transmission of the CG-UCI.

26. The method of example 24 or 25 wherein the indication of the time delay comprises a value of at least one bit in the CG-UCI indicating an end of the uplink burst comprising the transmission of the CG-UCI.

27. The method of example 18 wherein:
    the indication of the time delay comprises a value of an index, the value of the index comprising the indication of the time delay; and
    some other values of the index identify respective combinations in an ordered set of combinations of:
    time delays to the beginning of the downlink transmission opportunity; and
    durations of the downlink transmission opportunity.

28. The method of any one of examples 18 to 27 wherein the indication of the time delay indicates, at least, a symbol of the beginning of the downlink transmission opportunity.

29. The method of any one of examples 18 to 28 wherein transmitting the downlink transmission comprises transmitting the downlink transmission in at least one physical downlink shared channel (PDSCH).

30. The method of any one of examples 18 to 29 wherein receiving the CG-UCI comprises receiving a physical uplink shared channel (PUSCH) comprising the CG-UCI.

31. The method of any one of examples 18 to 30 wherein the COT was initiated by the UE.

32. The method of example 31 wherein the COT was initiated by the UE in a channel access priority class (CAPC), and wherein the CG-UCI further comprises an indication of the CAPC.

33. A base station apparatus comprising:
    at least one processor; and
    at least one processor-readable storage device comprising stored thereon processor-executable instructions that, when executed by the at least one processor, cause the at least one processor to, at least:
    execute a method according to any one of examples 18 to 32.

Discussion of Disclosed Embodiments

In embodiments such as those described herein, a UE may flexibly indicate a time delay (or offset) to a beginning of a downlink transmission opportunity during COT, and a duration of the downlink transmission opportunity. The beginning and the duration of the downlink transmission opportunity may be identified for different reasons, such as allowing a switching gap as may be appropriate between an uplink transmission and a subsequent downlink transmission, or between a downlink transmission and a subsequent uplink transmission.

COT sharing information may encode an indication of a time delay (or offset) to a beginning of a downlink transmission, a duration of the downlink transmission opportunity, a CAPC that a UE used to initiate the COT, or a combination of two or more thereof using a CIV or other indications such as those described above, for example.

Embodiments such as those described above may facilitate multiple switching points, for example uplink-downlink-uplink or uplink-downlink-uplink-downlink.

In general, embodiments such as those described above may make relatively efficient use of available resources when compared to other methods and apparatuses.

Although specific embodiments have been described and illustrated, such embodiments should be considered illustrative only and not as limiting the invention as construed according to the accompanying claims.

What is claimed is:

1. A method, comprising:
    transmitting, by a first user equipment (UE) to a second UE, a sidelink control information (SCI) in a sidelink burst during a channel occupancy (CO) initiated by the first UE in one or more channels of a shared spectrum, the SCI comprising CO time (COT) sharing information, the COT sharing information indicating:
        a duration within the CO initiated by the first UE available for a sidelink transmission opportunity by the second UE within the one or more channels after a time slot in which the SCI has been transmitted by the first UE, and
        a channel access priority class (CAPC) value used by the first UE to initiate the CO; and
    receiving, by the first UE from the second UE, a sidelink transmission within the sidelink transmission opportunity and in accordance with the COT sharing information in the SCI,
    wherein a first listen-before talk (LBT) procedure by the second UE before the sidelink transmission by the second UE is within a first switching gap within the CO, wherein the first switching gap is between the sidelink burst and the sidelink transmission by the second UE, and wherein the first LBT procedure by the second UE is a Type 2 LBT procedure.

2. The method of claim 1, wherein the COT sharing information indicates the duration by indicating a number of time slots of the sidelink transmission opportunity.

3. The method of claim 1, wherein the SCI further indicates an identifier (ID) of the first UE that initiated the CO.

4. The method of claim 1, wherein a CAPC value corresponding to the sidelink transmission by the second UE is at most equal to the CAPC value indicated by the COT sharing information.

5. The method of claim 1, wherein the receiving the sidelink transmission from the second UE comprises:
    receiving the sidelink transmission in at least one physical sidelink shared channel (PSSCH).

6. The method of claim 1, wherein the COT sharing information indicates that COT sharing is not available.

7. The method of claim 1, wherein the transmitting the SCI comprises:
    transmitting, to the second UE, the SCI in the sidelink burst, and the first switching gap between the sidelink burst and the sidelink transmission by the second UE is:
    16 μs or 25 μs, wherein the LBT procedure by the second UE after the sidelink burst and before the sidelink transmission by the second UE is a category 2 (CAT2) LBT procedure; or
    16 μs or less, wherein the first LBT procedure by the second UE is a category 1 (CAT1) LBT procedure without LBT being performed in the first switching gap.

8. The method of claim 1, further comprising:
    transmitting, by the first UE, a sidelink transmission resuming transmission in the CO initiated by the first UE following the sidelink transmission transmitted by the second UE within the sidelink transmission opportunity, wherein a second switching gap between the sidelink transmission by the second UE and the sidelink transmission resuming the transmission in the CO initiated by the first UE is:
    16 μs or 25 μs, wherein a second LBT procedure by the first UE after the sidelink transmission by the second UE and before the sidelink transmission resuming the CO is a CAT2 LBT procedure; or
    16 μs or less, wherein the second LBT procedure by the first UE is a CAT1 LBT procedure without LBT being performed in the second switching gap.

9. A first user equipment (UE), comprising:
    at least one processor; and
    a non-transitory computer readable storage medium storing programming, the programming including instructions that, when executed by the at least one processor, cause the first UE to perform operations including:
    transmitting, to a second UE, a sidelink control information (SCI) in a sidelink burst during a channel occupancy (CO) initiated by the first UE in one or more channels of a shared spectrum, the SCI comprising CO time (COT) sharing information, the COT sharing information indicating:
        a duration within the CO initiated by the first UE available for a sidelink transmission opportunity by the second UE within the one or more channels after a time slot in which the SCI has been transmitted by the first UE, and
        a channel access priority class (CAPC) value used by the first UE to initiate the CO; and
    receiving a sidelink transmission from the second UE within the sidelink transmission opportunity and in accordance with the COT sharing information in the SCI,
    wherein a first listen-before talk (LBT) procedure by the second UE before the sidelink transmission by the second UE is within a first switching gap within the CO, wherein the first switching gap is between the sidelink burst and the sidelink transmission by the second UE, and wherein the first LBT procedure by the second UE is a Type 2 LBT procedure.

10. The first UE of claim 9, wherein the COT sharing information indicates 8the duration by indicating a number of time slots of the sidelink transmission opportunity.

11. The first UE of claim 9, wherein the SCI further indicates an identifier (ID) of the first UE that initiated the CO.

12. A method, comprising:
    receiving, by a second user equipment (UE) from a first UE, a sidelink control information (SCI) in a sidelink burst during a channel occupancy (CO) initiated by the first UE in one or more channels of a shared spectrum, the SCI comprising CO time (COT) sharing information, the COT sharing information indicating:
- a duration within the CO initiated by the first UE available for a sidelink transmission opportunity by the second UE within the one or more channels after a time slot in which the SCI has been transmitted by the first UE, and
- a channel access priority class (CAPC) value used by the first UE to initiate the CO; and transmitting, by the second UE to the first UE, a sidelink transmission within the sidelink transmission opportunity and in accordance with the COT sharing information in the SCI, wherein a first listen-before talk (LBT) procedure by the second UE before the sidelink transmission by the second UE is within a first switching gap within the CO, wherein the first switching gap is between the sidelink burst and the sidelink transmission by the second UE, and wherein the first LBT procedure by the second UE is a Type 2 LBT procedure.

13. The method of claim 12, wherein the COT sharing information indicates the duration by indicating a number of time slots of the sidelink transmission opportunity.

14. The method of claim 12, wherein the SCI further indicates an identifier (ID) of the first UE that initiated the CO.

15. The method of claim 12, wherein a CAPC value corresponding to the sidelink transmission by the second UE is at most equal to the CAPC value indicated by the COT sharing information.

16. The method of claim 12, wherein the transmitting the sidelink transmission to the first UE comprises:
transmitting the sidelink transmission in at least one physical sidelink shared channel (PSSCH).

17. The method of claim 12, wherein the COT sharing information indicates that COT sharing is not available.

18. The method of claim 12, wherein the receiving the SCI comprises:
receiving, from the first UE, the SCI in the sidelink burst, and the first switching gap between the sidelink burst and the sidelink transmission by the second UE is:
- 16 μs or 25 μs, wherein the LBT procedure by the second UE after the sidelink burst and before the sidelink transmission by the second UE is a category 2 (CAT2) LBT procedure; or
- 16 μs or less, wherein the LBT procedure by the second UE is a category 1 (CAT1) LBT procedure without LBT being performed in the first switching gap.

19. The method of claim 12, further comprising:
receiving, from the first UE, a sidelink transmission resuming transmission in the CO initiated by the first UE following the sidelink transmission transmitted by the second UE within the sidelink transmission opportunity, wherein a second switching gap between the sidelink transmission by the second UE and the sidelink transmission resuming the CO initiated by the first UE is:
- 16 μs or 25 μs, wherein a second LBT procedure by the first UE after the sidelink transmission by the second UE and before the sidelink transmission resuming the transmission in the CO is a CAT2 LBT procedure; or
- 16 μs or less, wherein the second LBT procedure by the first UE is a CAT1 LBT procedure without LBT being performed in the second switching gap.

20. A second user equipment (UE), comprising:
at least one processor; and
a non-transitory computer readable storage medium storing programming, the programming including instructions that, when executed by the at least one processor, cause the second UE to perform operations including:
receiving, from a first UE, a sidelink control information (SCI) in a sidelink burst during a channel occupancy (CO) time initiated by the first UE in one or more channels of a shared spectrum, the SCI comprising CO time (COT) sharing information, the COT sharing information indicating:
- a duration within the CO initiated by the first UE available for a sidelink transmission opportunity by the second UE within the one or more channels after a time slot in which the SCI has been transmitted by the first UE, and
- a channel access priority class (CAPC) value used by the first UE to initiate the CO; and transmitting, to the first UE, a sidelink transmission within the sidelink transmission opportunity and in accordance with the COT sharing information in the SCI, wherein a first listen-before talk (LBT) procedure by the second UE before the sidelink transmission by the second UE is within a first switching gap within the CO, wherein the first switching gap is between the sidelink burst and the sidelink transmission by the second UE, and wherein the first LBT procedure by the second UE is a Type 2 LBT procedure.

* * * * *

UNITED STATES PATENT AND TRADEMARK OFFICE
CERTIFICATE OF CORRECTION

| | | |
|---|---|---|
| PATENT NO. | : 12,408,201 B2 | Page 1 of 1 |
| APPLICATION NO. | : 18/606858 | |
| DATED | : September 2, 2025 | |
| INVENTOR(S) | : Mohamed Adel Salem | |

It is certified that error appears in the above-identified patent and that said Letters Patent is hereby corrected as shown below:

In the Claims

In Column 40, in Claim 10, Line 59, delete "8the" and insert -- the --.

Signed and Sealed this
Fourteenth Day of October, 2025

John A. Squires
*Director of the United States Patent and Trademark Office*